US012633790B2

(12) United States Patent
Yang

(10) Patent No.: US 12,633,790 B2
(45) Date of Patent: May 19, 2026

(54) MOTOR WITH ROTOR HAVING PLURALITY OF OIL HOLES AND PLURALITY OF RUNNERS CONNECTED TO END PLATES

(71) Applicant: Huawei Digital Power Technologies Co., Ltd., Shenzhen (CN)

(72) Inventor: Shaobo Yang, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 363 days.

(21) Appl. No.: 18/184,093

(22) Filed: Mar. 15, 2023

(65) Prior Publication Data

US 2023/0299629 A1 Sep. 21, 2023

(30) Foreign Application Priority Data

Mar. 17, 2022 (CN) .......................... 202210264043.5

(51) Int. Cl.
H02K 1/32 (2006.01)
H02K 9/193 (2006.01)

(52) U.S. Cl.
CPC .............. H02K 1/32 (2013.01); H02K 9/193 (2013.01)

(58) Field of Classification Search
CPC ............ H02K 9/00; H02K 9/005; H02K 9/02; H02K 9/06; H02K 9/04; H02K 9/19; H02K 9/22; H02K 1/32; H02K 1/30; H02K 1/24; H02K 1/28; H02K 1/02; H02K 1/325; H02K 1/265; H02K 1/26; H02K 3/527; H02K 3/52; H02K 3/34; H02K 3/345; H02K 1/00; H02K 3/18; H02K 19/02; H02K 19/16; H02K 19/38

USPC ...... 310/52–65, 216.114, 216.119, 400, 402, 310/405, 411, 417, 412, 261.1, 262–269
See application file for complete search history.

(56) References Cited

U.S. PATENT DOCUMENTS

| | | | | | |
|---|---|---|---|---|---|
| 918,498 | A | * | 4/1909 | Behrend .................. | H02K 3/51 |
| | | | | | 310/194 |
| 2,736,829 | A | * | 2/1956 | Sills ......................... | H02K 1/08 |
| | | | | | 310/216.098 |
| 3,189,769 | A | * | 6/1965 | Willyoung ............. | H02K 9/225 |
| | | | | | 310/52 |

(Continued)

FOREIGN PATENT DOCUMENTS

| | | |
|---|---|---|
| CN | 102906969 A | 1/2013 |
| CN | 105009421 B | 1/2018 |

(Continued)

*Primary Examiner* — Maged M Almawri
(74) *Attorney, Agent, or Firm* — Maier & Maier, PLLC

(57) ABSTRACT

A rotor includes: a rotating shaft, having a hollow channel, where a plurality of oil holes connected to the hollow channel is disposed; and a rotor iron core assembly, sleeved on the rotating shaft, and including a first end plate, a second end plate, and an iron core body located between the first end plate and the second end plate. A plurality of first runners is connected to the plurality of oil holes and a plurality of second runners connected to the outside is disposed on inner sides of the end plate, and the first runner and the second runner are spaced along a circumferential direction and a radial direction and are not connected. A plurality of oil passages that run through the iron core body along an axial direction is spaced on the iron core body around the rotating shaft.

20 Claims, 18 Drawing Sheets

(56) References Cited

U.S. PATENT DOCUMENTS

| | | | | |
|---|---|---|---|---|
| 3,462,625 | A * | 8/1969 | Endress | H02K 1/32 |
| | | | | 310/61 |
| 3,521,094 | A * | 7/1970 | Widder | H02K 9/197 |
| | | | | 310/58 |
| 3,782,853 | A * | 1/1974 | Frister | H02K 9/06 |
| | | | | 416/186 A |
| 4,303,842 | A * | 12/1981 | Nathenson | H02K 3/22 |
| | | | | 310/201 |
| 4,315,172 | A * | 2/1982 | Intichar | H02K 9/225 |
| | | | | 310/64 |
| 4,467,229 | A * | 8/1984 | Ogita | H02K 9/12 |
| | | | | 310/157 |
| 5,144,175 | A * | 9/1992 | Craggs | H02K 9/06 |
| | | | | 310/63 |
| 5,189,325 | A * | 2/1993 | Jarczynski | H02K 9/197 |
| | | | | 310/61 |
| 5,424,593 | A * | 6/1995 | Vaghani | H02K 11/042 |
| | | | | 310/68 D |
| 5,666,016 | A * | 9/1997 | Cooper | H02K 3/24 |
| | | | | 310/59 |
| 5,925,960 | A * | 7/1999 | Hayes | H02K 17/20 |
| | | | | 29/889.3 |
| 5,932,948 | A * | 8/1999 | Morrison | H02K 3/527 |
| | | | | 310/214 |
| 5,994,804 | A * | 11/1999 | Grennan | H02K 9/06 |
| | | | | 310/58 |
| 6,232,691 | B1 * | 5/2001 | Anderson | H02K 29/10 |
| | | | | 310/179 |
| 6,234,767 | B1 * | 5/2001 | Takeda | H02K 9/06 |
| | | | | 417/366 |
| 6,727,634 | B2 * | 4/2004 | Tornquist | H02K 3/527 |
| | | | | 310/270 |
| 6,734,585 | B2 * | 5/2004 | Tornquist | H02K 1/325 |
| | | | | 310/58 |
| 6,794,792 | B2 * | 9/2004 | Wang | H02K 55/04 |
| | | | | 310/179 |
| 6,952,070 | B1 * | 10/2005 | Kaminski | H02K 3/51 |
| | | | | 310/64 |
| 7,489,057 | B2 * | 2/2009 | Zhou | H02K 9/197 |
| | | | | 310/61 |
| 8,004,140 | B2 * | 8/2011 | Alexander | H02K 1/2773 |
| | | | | 310/216.057 |
| 8,080,908 | B2 * | 12/2011 | Matsubara | H02K 1/32 |
| | | | | 310/156.53 |
| 8,970,074 | B2 * | 3/2015 | Wagner | H02K 7/003 |
| | | | | 310/59 |
| 9,041,232 | B2 * | 5/2015 | Shah | H02K 19/24 |
| | | | | 290/31 |
| 9,768,666 | B2 * | 9/2017 | Büttner | H02K 1/20 |
| 9,819,247 | B2 * | 11/2017 | Leberle | H02K 9/197 |
| 10,135,319 | B2 * | 11/2018 | Hanumalagutti | B60K 1/00 |
| 10,326,334 | B2 * | 6/2019 | Larjola | H02K 7/1823 |
| 10,630,134 | B2 * | 4/2020 | Goldstein | H02K 5/203 |
| 10,804,755 | B2 * | 10/2020 | Channapatana | H02K 15/021 |
| 10,826,363 | B2 * | 11/2020 | Huang | H02K 15/0407 |
| 11,418,077 | B2 * | 8/2022 | Krais | H02K 7/003 |
| 11,909,272 | B2 * | 2/2024 | Sakamoto | H02K 9/193 |
| 2003/0030333 | A1 * | 2/2003 | Johnsen | H02K 1/32 |
| | | | | 310/54 |
| 2003/0193256 | A1 * | 10/2003 | Liebermann | H02K 3/24 |
| | | | | 310/194 |
| 2004/0080218 | A1 * | 4/2004 | Weidman | H02K 1/32 |
| | | | | 310/61 |
| 2004/0163428 | A1 * | 8/2004 | Kim | D06F 37/269 |
| | | | | 68/140 |
| 2005/0253476 | A1 * | 11/2005 | Zhong | H02K 1/08 |
| | | | | 310/216.064 |
| 2006/0082228 | A1 * | 4/2006 | Urbahn | H02K 9/20 |
| | | | | 62/50.7 |
| 2008/0001495 | A1 * | 1/2008 | Qu | H02K 55/02 |
| | | | | 310/179 |

| | | | | |
|---|---|---|---|---|
| 2010/0133927 | A1 * | 6/2010 | Zhang | H02K 1/30 |
| | | | | 310/43 |
| 2010/0237725 | A1 * | 9/2010 | Tatematsu | B60L 7/14 |
| | | | | 310/61 |
| 2010/0320850 | A1 * | 12/2010 | Lemmers, Jr. | H02K 1/32 |
| | | | | 310/54 |
| 2011/0309697 | A1 * | 12/2011 | Kirkley, Jr. | H02K 5/203 |
| | | | | 310/64 |
| 2012/0025639 | A1 * | 2/2012 | Zywot | H02K 9/197 |
| | | | | 310/214 |
| 2012/0126643 | A1 * | 5/2012 | Zhong | H02K 1/325 |
| | | | | 310/59 |
| 2013/0038151 | A1 * | 2/2013 | Ohashi | H02K 7/086 |
| | | | | 310/59 |
| 2013/0057117 | A1 * | 3/2013 | Suzuki | B60K 7/0007 |
| | | | | 310/60 R |
| 2013/0101394 | A1 * | 4/2013 | Franzen | H02K 9/193 |
| | | | | 415/71 |
| 2013/0221772 | A1 * | 8/2013 | Miyamoto | H02K 9/19 |
| | | | | 310/54 |
| 2013/0313938 | A1 * | 11/2013 | Yamada | H02K 16/02 |
| | | | | 310/156.69 |
| 2014/0042841 | A1 * | 2/2014 | Rippel | H02K 9/193 |
| | | | | 310/54 |
| 2014/0191623 | A1 * | 7/2014 | Hillenbrand | H02K 1/22 |
| | | | | 310/60 R |
| 2014/0333163 | A1 * | 11/2014 | Horii | H02K 9/10 |
| | | | | 310/59 |
| 2014/0339952 | A1 * | 11/2014 | Jung | H02K 1/24 |
| | | | | 310/216.001 |
| 2015/0171708 | A1 * | 6/2015 | Akiyoshi | H02K 9/06 |
| | | | | 310/60 A |
| 2015/0288255 | A1 * | 10/2015 | Barker | H02K 1/2781 |
| | | | | 310/43 |
| 2016/0036276 | A1 * | 2/2016 | Yamagishi | H02K 1/22 |
| | | | | 310/59 |
| 2016/0164377 | A1 * | 6/2016 | Gauthier | H02K 1/32 |
| | | | | 310/54 |
| 2016/0261158 | A1 * | 9/2016 | Horii | H02K 1/32 |
| 2016/0261169 | A1 * | 9/2016 | Rawlinson | H02K 1/32 |
| 2016/0301268 | A1 * | 10/2016 | Watanabe | H02K 1/2706 |
| 2018/0062463 | A1 * | 3/2018 | Ito | H02K 1/32 |
| 2018/0123428 | A1 * | 5/2018 | Sturm | H02K 5/207 |
| 2018/0183297 | A1 * | 6/2018 | Akiyoshi | F04D 29/666 |
| 2018/0198331 | A1 * | 7/2018 | Sano | H02K 1/276 |
| 2018/0278126 | A1 * | 9/2018 | Goldstein | H02K 9/193 |
| 2019/0068012 | A1 * | 2/2019 | Yazaki | H02K 1/276 |
| 2019/0109515 | A1 * | 4/2019 | Hopkins | H02K 1/32 |
| 2019/0207447 | A1 * | 7/2019 | Swales | H02K 1/2766 |
| 2019/0207451 | A1 * | 7/2019 | Yoshizawa | H02K 1/276 |
| 2019/0267859 | A1 * | 8/2019 | Kitahara | H02K 1/276 |
| 2019/0288588 | A1 * | 9/2019 | Sato | H02K 1/32 |
| 2019/0312475 | A1 * | 10/2019 | Seidl | H02K 17/16 |
| 2019/0334409 | A1 * | 10/2019 | Dib | H02K 5/18 |
| 2020/0036249 | A1 * | 1/2020 | Krais | H02K 9/197 |
| 2020/0136451 | A1 * | 4/2020 | Zeichfüssl | F03D 9/25 |
| 2020/0186007 | A1 * | 6/2020 | Kitao | H02K 15/03 |
| 2020/0244124 | A1 * | 7/2020 | Kang | H02K 1/32 |
| 2020/0274411 | A1 * | 8/2020 | Kimoto | H02K 1/276 |
| 2020/0282822 | A1 * | 9/2020 | Oh | H02K 7/085 |
| 2020/0366158 | A1 * | 11/2020 | Morishita | B62D 5/0403 |
| 2021/0111614 | A1 * | 4/2021 | Fratila | H02K 1/16 |
| 2021/0119508 | A1 * | 4/2021 | Remboski | H02K 1/14 |
| 2021/0135533 | A1 * | 5/2021 | Samie | H02K 1/276 |
| 2024/0146133 | A1 * | 5/2024 | Nachtmann | H02K 9/19 |

FOREIGN PATENT DOCUMENTS

| | | |
|---|---|---|
| CN | 103427522 B | 3/2018 |
| CN | 111416456 A | 7/2020 |
| CN | 109565200 B | 1/2021 |
| CN | 113364184 A | 9/2021 |
| CN | 214314785 U | 9/2021 |

* cited by examiner

MOTOR WITH ROTOR HAVING PLURALITY OF OIL HOLES AND PLURALITY OF RUNNERS CONNECTED TO END PLATES

CROSS-REFERENCE TO RELATED APPLICATIONS

This application claims priority to Chinese Patent Application No. 202210264043.5, filed on Mar. 17, 2022. The disclosures of the aforementioned applications are hereby incorporated by reference in their entireties.

TECHNICAL FIELD

The embodiments relate to the field of vehicle technologies, a rotor, a motor, and an electric vehicle.

BACKGROUND

Currently, most motors of electric vehicles use oil cooling for heat dissipation. Because oil is insulated, compared with water cooling, cooling oil in an oil cooling structure can directly enter a stator and a rotor of the motor, and is closer to a heat source, thereby achieving better cooling effect.

In the conventional technology, when the motor rotates, the oil cooling structure has a problem of uneven flow distribution, that is, there is a difference in flow of oil throwing holes at two ends of a rotating shaft. The difference is related to factors such as an internal cavity structure of the rotating shaft and a rotational speed of the motor. Uneven oil throwing affects heat dissipation of the rotor and heat dissipation of a winding, resulting in a local hot spot. This limits performance of the motor or causes overtemperature of the motor.

SUMMARY

The embodiments may provide a rotor, a motor, and an electric vehicle, to implement even oil throwing of the rotor, avoid causing a local hot spot, help improve performance of the motor or avoid excessive heating of the motor, and implement low costs.

Therefore, the embodiments may use the following solutions:

According to a first aspect, an embodiment may provide a rotor. The rotor includes: a rotating shaft, having a hollow channel, where a plurality of oil holes may be spaced along a circumferential direction on an outer wall of at least one end of the rotating shaft, and each oil hole is connected to the hollow channel; and a rotor iron core assembly, sleeved on the rotating shaft, and including a first end plate, a second end plate, and an iron core body located between the first end plate and the second end plate. A plurality of first runners and a plurality of second runners are respectively disposed along the circumferential direction on inner sides of the first end plate and the second end plate that face the iron core body, the plurality of oil holes at one end of the rotating shaft are connected to the plurality of first runners on one of the first end plate and the second end plate in a one-to-one correspondence, the plurality of second runners may be separately connected to the outside of the rotor iron core assembly, and each first runner and each second runner are spaced along the circumferential direction and a radial direction and are not connected. A plurality of oil passages may be spaced on the iron core body along the circumferential direction, and each oil passage runs through the iron core body along an axial direction; if either the plurality of first runners or the plurality of second runners may be respectively connected to outer portions of ports of the plurality of oil passages away from the rotating shaft, the plurality of second runners or the plurality of first runners may be respectively connected to inner portions of the ports of the plurality of oil passages close to the rotating shaft; and each first runner is connected to at least one oil passage, and each second runner is connected to at least one oil passage.

According to the rotor in this embodiment, each first runner and each second runner on the end plate are spaced along the circumferential direction and the radial direction and are not connected, the first runner is connected to the oil hole of the rotating shaft, and the second runner is connected to the outside of the end plate. In this way, when the first runner is connected to one of the outer portion and the inner portion of the port of the oil passage along the radial direction, and the second runner is connected to the other of the outer portion and the inner portion of the port of the oil passage along the radial direction, cooling oil in the hollow channel of the rotating shaft may enter the oil passage through the oil hole and the first runner, and does not interfere with oil outlet of the second runner, and the cooling oil entering the oil passage spreads along the radial direction after being spread along the axial direction, for example, from the outer portion of the port to the inner portion of the port, or from the inner portion of the port to the outer portion of the port. In this way, thicknesses of oil films in the oil passages can be basically consistent, so that oil amounts entering the second runner from the inner portions of the ports at two ends of the rotor iron core assembly are not greatly different, and do not interfere with oil inlet of the first runner, thereby ensuring even oil throwing, avoiding a local hot spot, and improving performance of the motor.

In a possible implementation, the plurality of first runners may be respectively connected to the outer portions of the ports of the plurality of oil passages, and the plurality of second runners may be respectively connected to the inner portions of the ports of the plurality of oil passages; or the plurality of first runners may be respectively connected to the inner portions of the ports of the plurality of oil passages, and the plurality of second runners may be respectively connected to the outer portions of the ports of the plurality of oil passages, and a side of the oil passage close to the rotating shaft is closed. The first runner includes: a first arc-shaped section, extending along a circumferential direction of the rotor iron core assembly, where the first arc-shaped section is connected to the oil passage in a one-to-one correspondence, or two ends of the first arc-shaped section are respectively connected to two oil passages that are adjacent along the circumferential direction; and a first radial section, where one end of the first radial section is connected to the first arc-shaped section, and the other end of the first radial section extends to an inner circumferential wall of the rotor iron core assembly along the radial direction towards the rotating shaft, and is connected to the oil hole. In other words, in this implementation, one solution of the first runner is to include the first arc-shaped section and the first radial section. One end of the first radial section is connected to the oil hole, and the other end of the first radial section is connected to the first arc-shaped section. The first arc-shaped section may be connected to the oil passage in a one-to-one correspondence, or two ends of the first arc-shaped section may be respectively connected to two oil passages. In this way, the cooling oil in the hollow channel of the rotor may first enter the first radial section, then enter the first arc-shaped section, and next enter the oil passage connected to the first arc-shaped section.

In a possible implementation, the plurality of first runners may be respectively connected to the inner portions of the ports of the plurality of oil passages, the plurality of second runners may be respectively connected to the outer portions of the ports of the plurality of oil passages, and a side of the oil passage close to the rotating shaft is open. The first runner includes a first arc-shaped section, where a side of the first arc-shaped section close to the rotating shaft may be open and may be connected to the oil hole. First arc-shaped sections of the plurality of first runners are connected to the plurality of oil passages in a one-to-one correspondence; or a first arc-shaped section of each first runner is separately connected to two oil passages that are adjacent along the circumferential direction. That is, in this implementation, another solution of the first runner is to include the first arc-shaped section. A side of the first arc-shaped section close to the rotating shaft is open to be connected to the oil hole. The first arc-shaped section may be connected to the oil passage in a one-to-one correspondence, or two ends of the first arc-shaped section may be respectively connected to two oil passages. In this way, the cooling oil in the hollow channel of the rotor may directly enter the first arc-shaped section, and then enter the oil passage connected to the first arc-shaped section.

In a possible implementation, first arc-shaped sections of at least two first runners are connected to form an arc-shaped structure; or the first arc-shaped sections of the plurality of first runners are connected to form a closed ring. That is, in this implementation, the first arc-shaped sections of the plurality of first runners may be connected, or the first arc-shaped sections of all the first runners are connected to form a closed ring. In this way, the cooling oil flows to each oil passage as soon as possible, and the thickness of the oil film tends to be consistent as soon as possible.

In a possible implementation, the second runner includes a through opening disposed on the first end plate or the second end plate, one end of the through opening along the axial direction is connected to the outside, and the other end of the through opening along the axial direction is correspondingly connected to the oil passage. A side of the oil passage close to the rotating shaft is closed; or a side of the oil passage close to the rotating shaft is open, the plurality of first runners may be respectively connected to the inner portions of the ports of the plurality of oil passages, the plurality of second runners may be respectively connected to the outer portions of the ports of the plurality of oil passages, and a side of the through opening close to the rotating shaft is closed; or a side of the oil passage close to the rotating shaft is open, the plurality of first runners may be respectively connected to the outer portions of the ports of the plurality of oil passages, the plurality of second runners may be respectively connected to the inner portions of the ports of the plurality of oil passages, a side of the through opening close to the rotating shaft is open, and the through opening extends to the inner circumferential wall of the rotor iron core assembly along the radial direction. That is, in this implementation, one solution of the second runner is to include the through opening. When the cooling oil first enters the oil passage from an outer side of the oil passage and spreads to an inner side of the oil passage, if a side of the oil passage close to the rotating shaft is closed, a side of the through opening close to the rotating shaft is closed; or if a side of the oil passage close to the rotating shaft is open, a side of the through opening close to the rotating shaft is open. Further, when the cooling oil first enters the oil passage from the inner side of the oil passage and spreads to the outer side of the oil passage, regardless of whether a side of the oil passage close to the rotating shaft is open or closed, a side of the through opening close to the rotating shaft is closed.

In a possible implementation, the second runner includes: a second arc-shaped section, extending along a circumferential direction of the rotor iron core assembly, where the second arc-shaped section is connected to the oil passage in a one-to-one correspondence, or two ends of the second arc-shaped section are respectively connected to two oil passages that are adjacent along the circumferential direction; and a second radial section, connected to the second arc-shaped section and extending along the radial direction away from the rotating shaft, where an oil throwing hole connected to the outside is disposed on the second radial section. The second arc-shaped section and the first arc-shaped section of the first runner are spaced along the radial direction. That is, in this implementation, another solution of the second runner is to include the second arc-shaped section and the second radial section. A side of the second arc-shaped section that faces the rotating shaft may be closed or opened, which can be selected according to a flow mode of the cooling oil, such as outer side first and inner side second or inner side first and outer side second, and whether a side of the oil passage close to the rotating shaft is open.

In a possible implementation, the plurality of first runners may be respectively connected to the outer portions of the ports of the plurality of oil passages, the plurality of second runners may be respectively connected to the inner portions of the ports of the plurality of oil passages, the first arc-shaped section is away from the rotating shaft relative to the second arc-shaped section, and each second arc-shaped section is located between first radial sections of two adjacent first runners along the circumferential direction. A side of the oil passage close to the rotating shaft is closed, and a side of the second arc-shaped section of the second runner close to the rotating shaft is closed; or a side of the oil passage close to the rotating shaft is open, a side of the second arc-shaped section of the second runner close to the rotating shaft is open, and the second arc-shaped section extends to the inner circumferential wall of the rotor iron core assembly along the radial direction. That is, in this implementation, when the cooling oil first enters the oil passage from an outer side of the oil passage and spreads to an inner side of the oil passage, if a side of the oil passage close to the rotating shaft is open, a side of the second arc-shaped section close to the rotating shaft is open. If a side of the oil passage close to the rotating shaft is closed, a side of the through opening close to the rotating shaft is closed. When the cooling oil first enters the oil passage from the inner side of the oil passage and spreads to the outer side of the oil passage, regardless of whether a side of the oil passage close to the rotating shaft is open or closed, a side of the second arc-shaped section close to the rotating shaft is closed.

In a possible implementation, the plurality of first runners may be respectively connected to the inner portions of the ports of the plurality of oil passages, the plurality of second runners may be respectively connected to the outer portions of the ports of the plurality of oil passages, and the second arc-shaped section of the second runner is away from the rotating shaft relative to the first arc-shaped section of the first runner. Second arc-shaped sections of at least two second runners are connected to form an arc-shaped structure; or the second arc-shaped sections of the plurality of second runners are connected to form a closed ring. That is, in this implementation, the second runner may be connected to the oil passage in a one-to-one correspondence, or two ends of the second arc-shaped section of the second runner may be respectively connected to two oil passages. In addition, second arc-shaped sections of adjacent second runners may be further connected, or the second arc-shaped sections of all the second runners may be connected to form a closed ring. In this way, the cooling oil flows to each oil passage as soon as possible, and the thickness of the oil film tends to be consistent as soon as possible.

In a possible implementation, at the first end plate and the second end plate, the plurality of first runners and the plurality of oil passages are disposed in a one-to-one correspondence, and the plurality of second runners and the plurality of oil passages are disposed in a one-to-one correspondence; or at the first end plate, the plurality of second runners and the plurality of oil passages are disposed in a one-to-one correspondence, and the first runner is disposed in a correspondence with one of two adjacent oil passages; and at the second end plate, the plurality of second runners and the plurality of oil passages are disposed in a one-to-one correspondence, and the first runner is disposed in a correspondence with the other of the two adjacent second runners; or at the first end plate, the first runner is connected to two adjacent oil passages along the circumferential direction, and the second runner is located between two adjacent first runners and is connected to other two adjacent oil passages; and at the second end plate, the first runner is connected to the two adjacent oil passages, and the second runner is located between the two adjacent first runners and is connected to the other two adjacent oil passages; or at the first end plate, the first runner is connected to two adjacent oil passages along the circumferential direction, and the second runner is located between two adjacent first runners and is connected to other two adjacent oil passages; and at the second end plate, the first runner is connected to the other two adjacent oil passages, and the second runner is located between the two adjacent first runners and is connected to the two adjacent oil passages. That is, in this implementation, the first end plate and the second end plate may be disposed facing each other, or may be disposed in a staggered manner. In addition, the first runner and the second runner on the first end plate and the second end plate may be respectively connected to oil passages in a one-to-one correspondence, or may be connected to two oil passages.

In a possible implementation, a cross section of the oil passage is a rectangle; or the oil passage includes a first channel, a third channel, and a second channel that are arranged in sequence close to the rotating shaft along the radial direction and that run through the iron core body along the axial direction, where a port of the first channel is the outer portion, a port of the second channel is the inner portion, and a width of the third channel along the circumferential direction is less than a width of each of the first channel and the second channel along the circumferential direction, so that a cross section of the oil passage is I-shaped; or the oil passage includes a first channel, a third channel, and a second channel that are arranged in sequence close to the rotating shaft along the radial direction, where the first channel runs through the iron core body along the axial direction, the second channel extends from one end of the iron core body to the middle or the other end of the iron core body along the axial direction, a port of the first channel is the outer portion, a port of the second channel is the inner portion, and the third channel is located in the middle of the iron core body along the axial direction and a width of the third channel along the circumferential direction is less than a width of each of the first channel and the second channel along the circumferential direction, so that a cross section of the oil passage on the third channel is I-shaped, and a cross section of the oil passage on a part other than the third channel is in a shape of two parallel line segments. That is, in this implementation, a shape of the cross section of the oil passage on the iron core body may be an I-shaped shape, or may be a rectangle, or may be another shape as required. The shape of the oil passage on the iron core body may not be limited, and an opening structure with a larger size in the radial direction can be used as a deformation of the oil passage on the iron core body.

In a possible implementation, the iron core body includes a plurality of silicon steel sheets arranged along the axial direction, where the first end plate is of an integrated structure, and the second end plate is of an integrated structure; or the first end plate and the second end plate each include at least a first silicon steel sheet and a second silicon steel sheet that are arranged along the axial direction, the second silicon steel sheet is located between the first silicon steel sheet and the iron core body, a through hole connected to the outside is disposed on the first silicon steel sheet, a first pattern and a second pattern are disposed on the second silicon steel sheet, a plate surface of the first silicon steel sheet and the first pattern form the first runner, and the plate surface of the first silicon steel sheet, the through hole, and the second pattern form the second runner, where when the plurality of first runners and/or the plurality of second runners form a closed ring, the first silicon steel sheet is fixedly connected to the second silicon steel sheet. That is, in this implementation, the rotor iron core assembly may include only the plurality of silicon steel sheets, and silicon steel sheets at two ends may be used as the first end plate and the second end plate and may be configured to set the first runner and the second runner. Alternatively, the rotor iron core assembly may include a common end plate and the plurality of silicon steel sheets, and the first runner and the second runner are disposed on the common end plate.

In a possible implementation, the rotor further includes a sleeve, the sleeve is disposed around an outer circumferential wall of the rotor iron core assembly, and the sleeve covers a gap between the first end plate and the iron core body, a gap between a plurality of silicon steel sheets of the iron core body, and a gap between the iron core body and the second end plate. That is, in this implementation, because the iron core body is formed by stacking silicon steel sheets, and two sides are pressed by using end plates, pressing force is large, and there are still gaps between the silicon steel sheets and between the silicon steel sheet and the end plate. When the oil in the oil passage of the rotor is used to promote an axial flow of cooling oil, oil leakage occurs in a radial gap during high-speed rotation of the rotor. A loss is increased when oil leakage enters an air gap, and a cooling effect is weakened. By coating an outer surface of the rotor iron core assembly with a cylindrical sleeve, the sleeve can cover the gap between the end plate and the iron core body along the axial direction, that is, a problem that the cooling oil affects the loss and the cooling effect through the gap can be avoided.

According to a second aspect, an embodiment may provide a motor. The motor includes a stator and the rotor provided in the first aspect. The rotor is rotatably sleeved in the stator, and the stator includes a stator iron core and a stator winding wound around the stator iron core.

According to a third aspect, an embodiment may provide an electric vehicle. The electric vehicle includes a transmission apparatus, a wheel, and the motor provided in the second aspect. The motor, the transmission apparatus, and the wheel are sequentially connected through transmission, the transmission apparatus is configured to transfer driving force output by the motor to the wheel, and the wheel is configured to drive the electric vehicle to travel.

Other features and advantages are described in detail in the following part of embodiments.

BRIEF DESCRIPTION THE OF DRAWINGS

The following briefly describes the accompanying drawings that need to be used in the descriptions of embodiments or the conventional technology.

DETAILED DESCRIPTION OF THE EMBODIMENTS

The following describes the embodiments with reference to the accompanying drawings.

Locations or location relationships indicated by terms "center", "up", "down", "in front of", "behind", "left", "right", "vertical", "horizontal", "top", "bottom", "inside", "outside", and the like are based on locations or location relationships shown in the accompanying drawings, and are merely intended for simplifying descriptions, instead of indicating or implying that a mentioned apparatus or component needs to be provided at a location or constructed and operated at a location, and therefore shall not be understood as limitations.

In the descriptions, it should be noted that, unless otherwise specified and limited, terms "mount", "link", and "connect" should be understood in a broad sense, for example, may mean a fixed connection, may be a detachable connection, or may be a butt joint connection or an integrated connection. Persons of ordinary skill in the art can understand meanings of the foregoing terms.

In the descriptions, the described features, structures, materials, or characteristics may be combined in a proper manner in any one or more of embodiments or examples.

Figure 1:
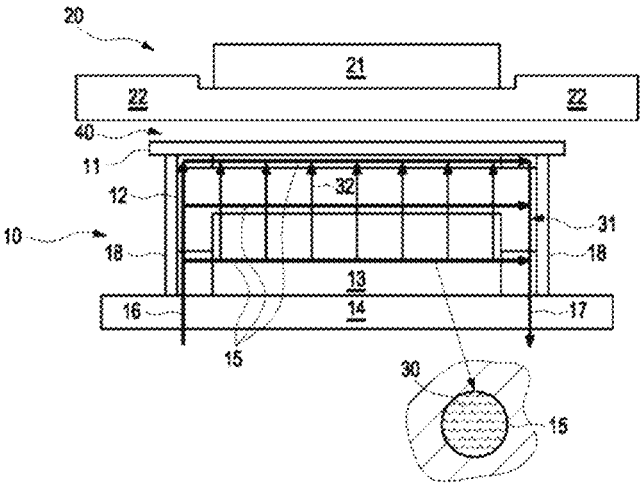
FIG. 1 is a schematic diagram of a sectional structural of an upper part of an asynchronous motor.

FIG. 1 is a schematic diagram of a sectional structural of an upper part of an asynchronous motor. As shown in FIG. 1, the motor has a rotor 10 and a stator 20. The rotor 10 is rotatably sleeved in the stator 20. The rotor 10 has a hollow shaft 14 for cooling fluid 30 to pass through, a laminated iron core 13 mounted on the hollow shaft 14, and a rat cage 12 arranged on the laminated iron core 13, and the hollow shaft 14 has at least one radial discharge channel 16 for the cooling fluid 30.

A plurality of axial cooling channels 15 extending through the laminated iron core 13 and the rat cage 12 of the rotor may have different radial distances relative to a rotation axis of the rotor 10. A cross section of the cooling channel 15 in the rotor laminated iron core 13 is shown in a local enlarged diagram. The cooling channel 15 is fully filled with the cooling fluid 30, to generate a larger cooling-air fluid leakage flow 32 flowing through the rotor laminated iron core 13.

In addition, a circumferential surface of the rotor 10 is formed by an air gap cylinder 11, that is, the air gap cylinder 11 of the rotor 10 is located in an air gap 40 between the rotor 10 and the stator 20. The air gap cylinder seals the rotor 10 outwards along a radial direction and prevents the cooling fluid 30 from flowing out of the rotor 10 along the radial direction.

In FIG. 1, a flow path of the cooling oil is further shown by using an arrow. A fluid supply pipeline 16 leads the cooling fluid from internal space of the hollow shaft 14 into a to-be-cooled active part of the rotor 10. Sealing elements 18 on two end sides prevent the cooling fluid from flowing out of the rotor 10 along an axial direction. A main stream 31 of the cooling fluid flows through the cooling channel 15 along the axial direction and reaches an opposite end side of the rotor laminated iron core 13 along the interior of the air gap cylinder 11, is deflected back to the hollow shaft 14 at the end side, and then flows back to the hollow shaft 14 through a fluid backflow pipeline 17.

In the asynchronous motor shown in FIG. 1, the cooling fluid does not flow out of the rotor and eject to the internal space of the motor, which affects heat dissipation of the rotor and heat dissipation of the winding on the stator, and easily forms a local hot spot, thereby limiting performance of the motor or causing overtemperature of the motor.

Figure 2:
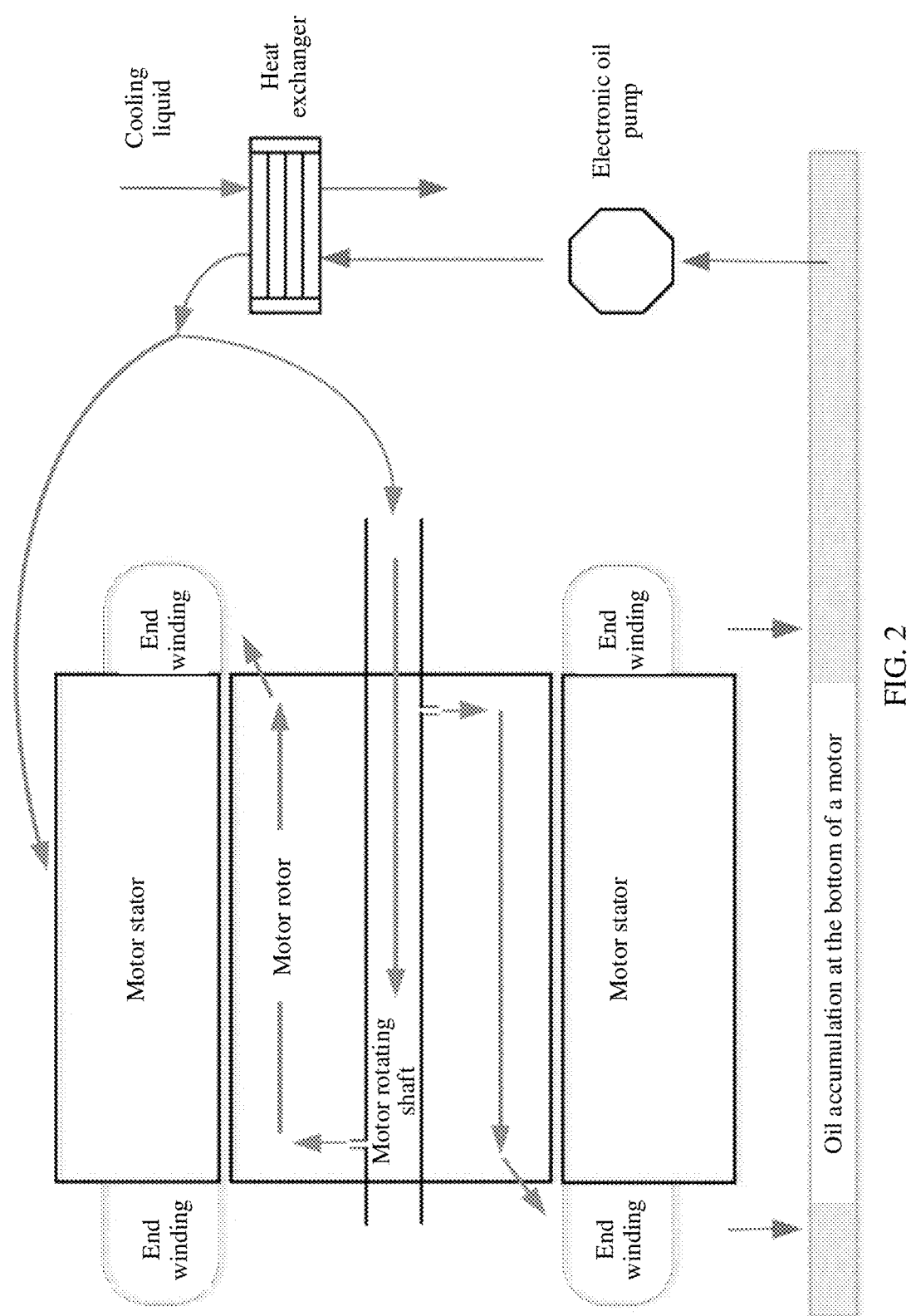
FIG. 2 is a schematic diagram of a flow path of cooling oil of an oil-cooled power assembly.

FIG. 2 is a schematic diagram of a flow path of cooling oil of an oil-cooled power assembly. As shown in FIG. 2, the oil-cooled power assembly becomes a commonly used oil cooling structure. An electronic oil pump extracts oil accumulated at the bottom of a motor, that is, high-temperature oil, and sends the high-temperature oil to a heat exchanger. After being cooled by the cooling oil, the high-temperature oil becomes low-temperature oil, and then enters a motor stator and a motor rotor. Because the oil pump can generate oil pressure, the cooling oil that enters the stator may be sprayed to the stator, and the cooling oil that enters the rotor flows into a hollow channel of a motor rotating shaft. When the rotor rotates at a high speed, the cooling oil forms an oil film on an inner surface of the rotating shaft for heat exchange. Under the action of centrifugal force, the cooling oil is pushed into a rotor iron core from oil holes at two ends of the rotating shaft. The rotor iron core has an axial runner, and the cooling oil is used again for heat exchange, which can cool a magnetic steel to a maximum extent. Finally, the cooling oil in the rotor is thrown out from two sides of the rotor, and end windings are cooled. After heat absorption, the cooling oil becomes the high-temperature oil, and flows back to the bottom of the motor under the action of gravity, to form an oil path circulation.

However, the oil cooling structure shown in FIG. 2 has a problem of uneven flow distribution when the motor rotates, that is, there is a difference in flow of the oil holes at the two ends of the rotating shaft. The difference is related to factors such as an internal cavity structure of the rotating shaft and a rotational speed of the motor. Uneven oil throwing affects heat dissipation of the rotor and heat dissipation of the winding, and forms a local hot spot, which limits performance of the motor or causes overtemperature of the motor.

Figure 3A:
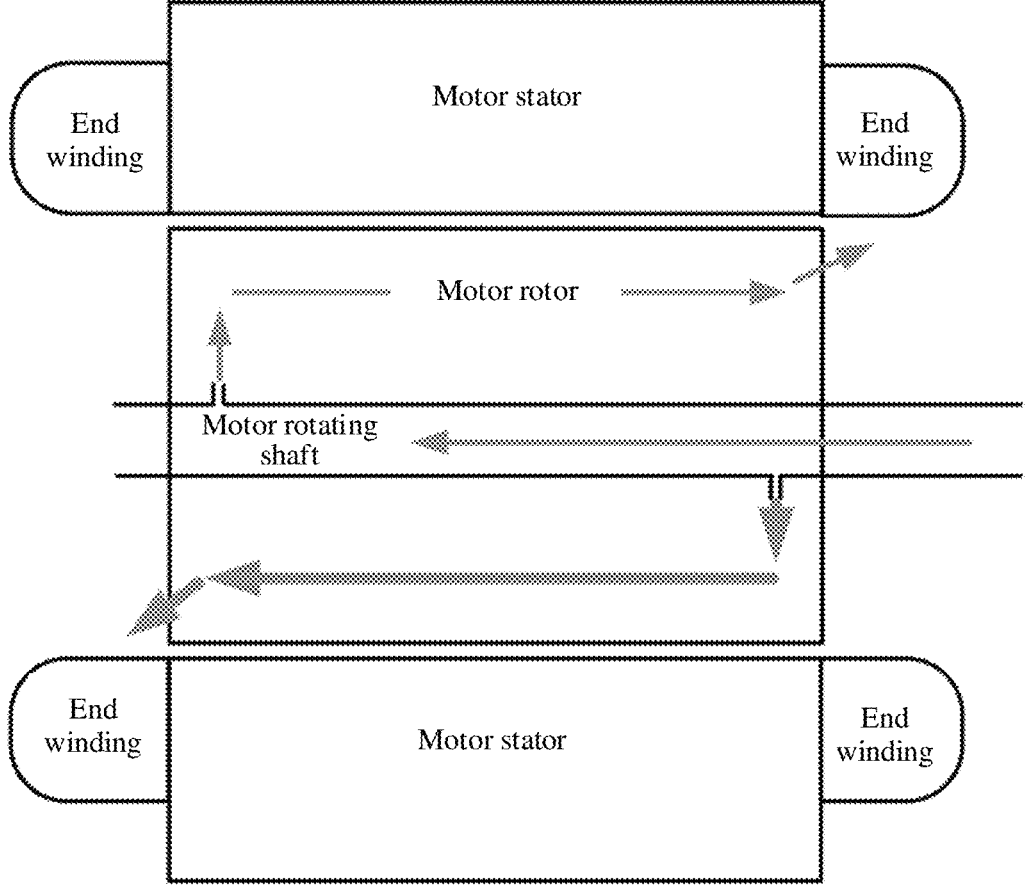
FIG. 3A is a schematic diagram of uneven oil throwing of a rotor of the oil-cooled power assembly shown in FIG. 2.
Figure 3B:
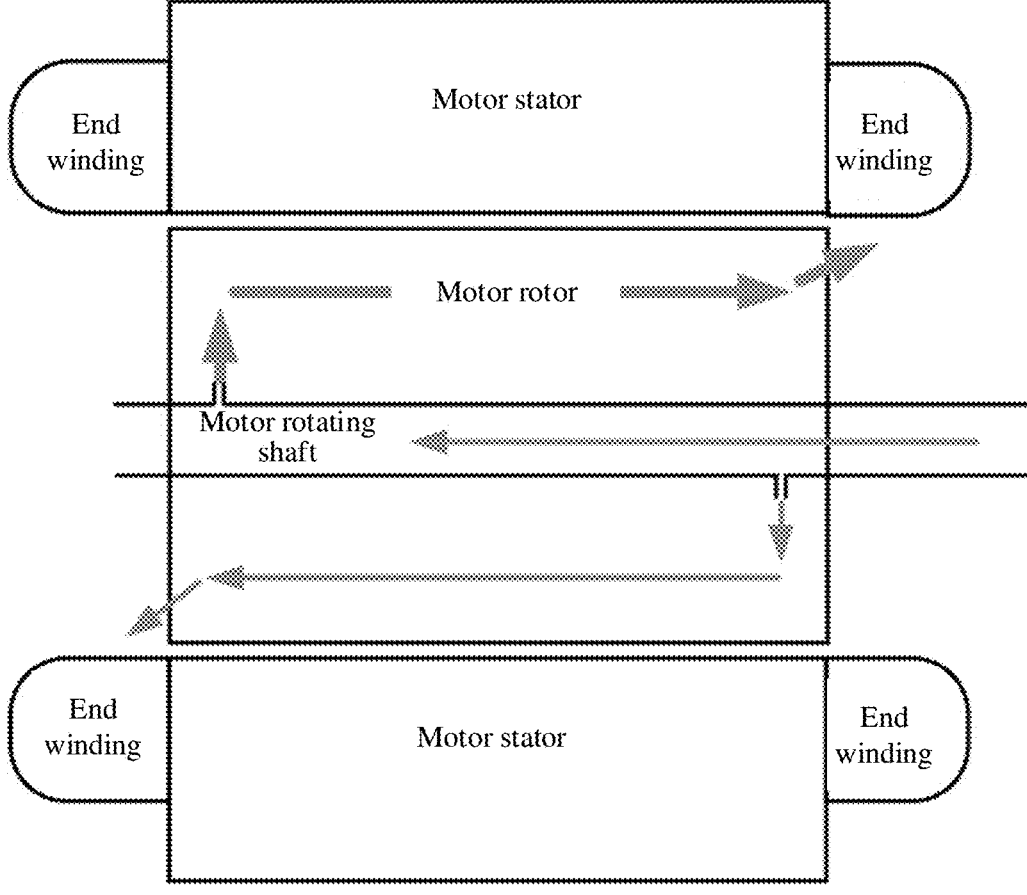
FIG. 3B is a schematic diagram of uneven oil throwing of a rotor of the oil-cooled power assembly shown in FIG. 2.

FIG. 3A and FIG. 3B are schematic diagrams of uneven oil throwing of a rotor of the oil-cooled power assembly shown in FIG. 2. As shown in FIG. 3A, an oil outlet amount of an oil hole on the upper left of the rotating shaft of the motor is less than an oil outlet amount of an oil hole on the lower right of the rotating shaft of the motor, so that an oil amount in an axial runner above the rotating shaft of the motor is less than an oil amount in an axial runner below the rotating shaft of the motor. Consequently, the oil amounts thrown out from the oil holes at two ends of the rotating shaft are different. As shown in FIG. 3B, an oil outlet amount of an oil hole on the upper left of the rotating shaft of the motor is greater than an oil outlet amount of an oil hole on the lower right of the rotating shaft of the motor, so that an oil amount in an axial runner above the rotating shaft of the motor is greater than an oil amount in an axial runner below the rotating shaft of the motor. Consequently, oil amounts thrown out from the oil holes at two ends of the rotating shaft are different.

Figure 4A:
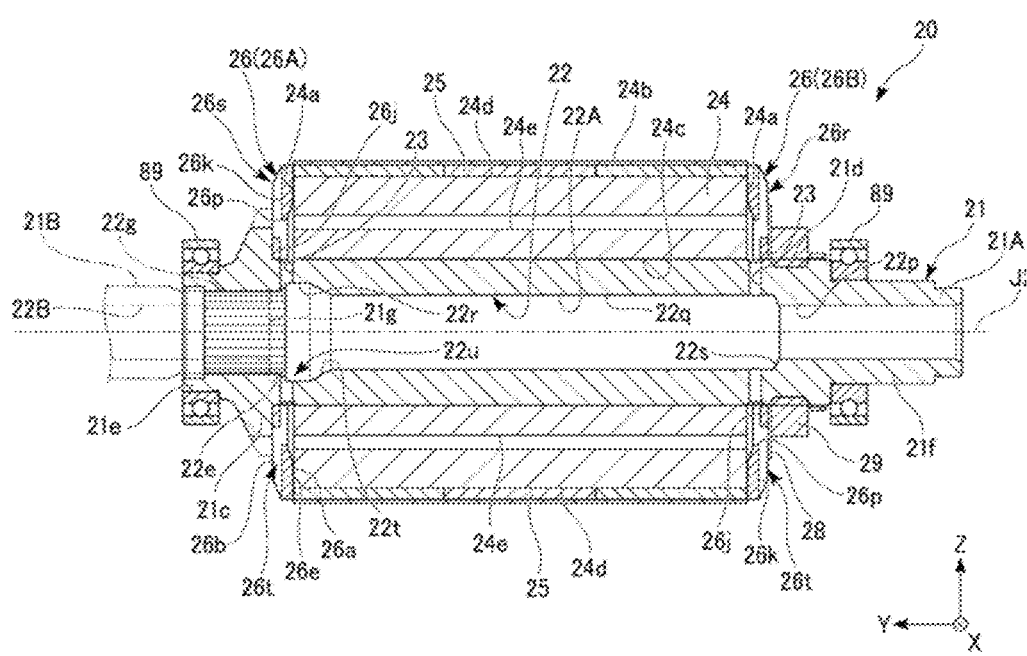
FIG. 4A is a schematic diagram of a sectional structure of a rotor.

FIG. 4A is a schematic diagram of a sectional structure of a rotor. As shown in FIG. 4A, the rotor includes a shaft 21, a rotor iron core 24, and a pair of end plates 26. The shaft 21 has a first shaft part 21A and a second shaft part 21B that are connected to each other coaxially. A pair of through holes 23 are disposed on the first shaft part 21A. The through hole 23 extends along a radial direction to connect the outside of the shaft 21 to a hollow part 22. One party between a clamped flange part 21c and the rotor iron core 24 in the pair of end plates 26 is used as a first end plate 26A, and the other party between a clamped nut 29 and the rotor iron core 24 is used as a second end plate 26B.

Figure 4B:
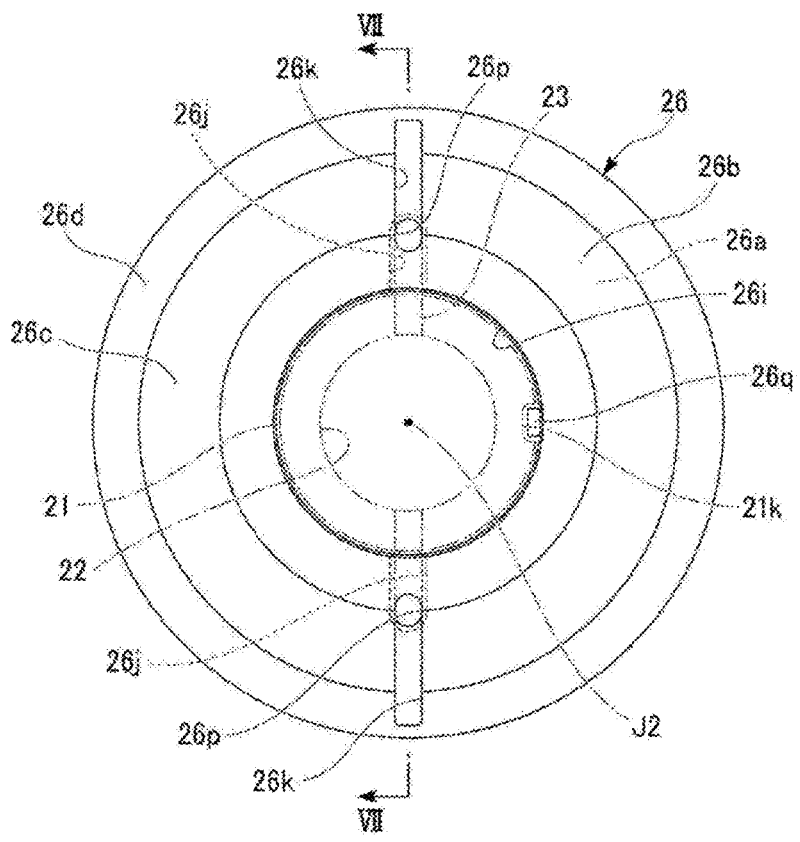
FIG. 4B is a schematic diagram of a structure of an end plate of the rotor shown in FIG. 4A.

FIG. 4B is a schematic diagram of a structure of an end plate of the rotor shown in FIG. 4A. As shown in FIG. 4A and FIG. 4B, the end plate 26 has a first surface 26a disposed opposite to an axial end face of the rotor iron core 24 and a second surface 26b facing a side opposite to the first surface. The end plate 26 is further provided with a plate through hole 26p, a first concave part 26j, and a second concave part 26k that extend along an axial direction. The first concave part 26j is located on the first surface 26a and extends radially from the plate through hole 26p to an inner side. The second concave part 26k is located on the second surface 26b and extends radially from the plate through hole 26p to an outer side.

In addition, the first concave part is opened on a radial inner side of the end plate 26 and is separately connected to a plurality of through holes 23. An opening along an axial direction of the first concave part is covered by the rotor iron core 24. An opening along an axial direction of the second concave part has a coating part covered by a cover part such as the flange part 21c (for the end plate 26A) or a washer 28 (for the end plate 26B) and an open part not covered by the cover part such as a first open part 26s (for the end plate 26A) or a second open part 26r (for the end plate 26B).

Oil provided to the interior of the hollow part 22 of the shaft 21 flows radially to the outer side through the through hole 23. Then, the oil flows from the opening on the radial outer side of the through hole 23 to a first groove 26j, flows to the first surface 26a and the second surface 26b through the plate through hole 26p, and is released to the outer side of the rotor 20 through the second groove 26k. The oil released to the outer side of the rotor 10 may be provided to a coil end 31a of the stator 20 to cool the coil end 31a.

In addition, an iron core through hole 24e connects the first grooves 26j of each of the pair of end plates 26, that is, the end plate 26A and the end plate 26B, to each other. In other words, the iron core through hole 24e connects an oil flow path 26t of each of the pair of end plates 26 to each other. An opening of the iron core through hole 24e is located at a position close to the radial outer side of the plate through hole 26p of the pair of end plates 26. Therefore, the oil can be accumulated inside the iron core through hole 24e under the action of centrifugal force of the rotor 20, and the oil can be supplied from the iron core through hole 24e to the first groove 26j of the end plates 26 on the two sides. In addition, when the oil in the first groove 26j on one side of the pair of end plates 26 is insufficient, the oil can be supplied from the other side through the iron core through hole 24e. Therefore, approximately equal oil amount can be released from each end plate 26 to the coil end 31a, and stable cooling of the coil 31a can be performed.

Because the first concave part 26j and the second concave part 26k on a middle end plate of the rotor shown in FIG. 4A are located on two opposite sides of the end plate 26, that is, are disposed separately, and the first concave part 26j and the second concave part 26k are connected through the plate through hole 26p, interference exists between oil inlet and oil throwing, and the oil is thrown out when the oil is not filled with the iron core through hole, and consequently uneven oil throwing of the rotor is caused, which affects heat dissipation of the rotor and heat dissipation of the winding on the stator, and easily forms a local hot spot, thereby limiting performance of the motor or causing overtemperature of the motor.

In view of this, the embodiments may provide a rotor, a motor, and an electric vehicle. The electric vehicle includes a transmission apparatus, a wheel, and a motor. The motor, the transmission apparatus, and the wheel are sequentially connected through transmission, the transmission apparatus is configured to transfer driving force output by the motor to the wheel, and the wheel is configured to drive the electric vehicle to travel. The motor includes a stator and a rotor. The rotor is rotatably sleeved in the stator, and the stator includes a stator iron core and a stator winding wound around the stator iron core. According to the rotor provided in the embodiments, a low-cost solution may be used to resolve a problem of a local hot spot that is caused by uneven oil throwing of the motor rotor. In a case of uneven oil throwing at two ends of the rotating shaft, oil amounts finally thrown to the coils at the two ends may be made equal. This may implement cooling and may be compatible with positive and reverse rotation of the motor. In an example, the rotor in the embodiments can improve a cooling effect, reduce a temperature of the motor by 15° C., and keep costs unchanged. In addition, it should be noted that cooling oil is used as an example for description in the embodiments. It may be understood that another cooling fluid may also be used.

Figure 5A:
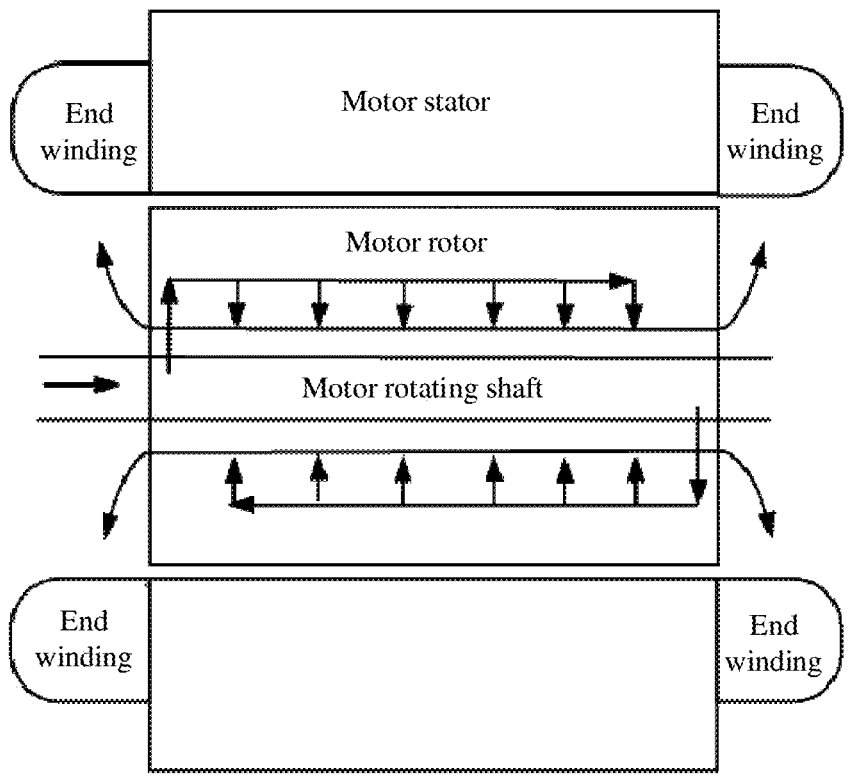
FIG. 5A is a schematic diagram of a first flow path of cooling oil in a rotor according to an embodiment.
Figure 5B:
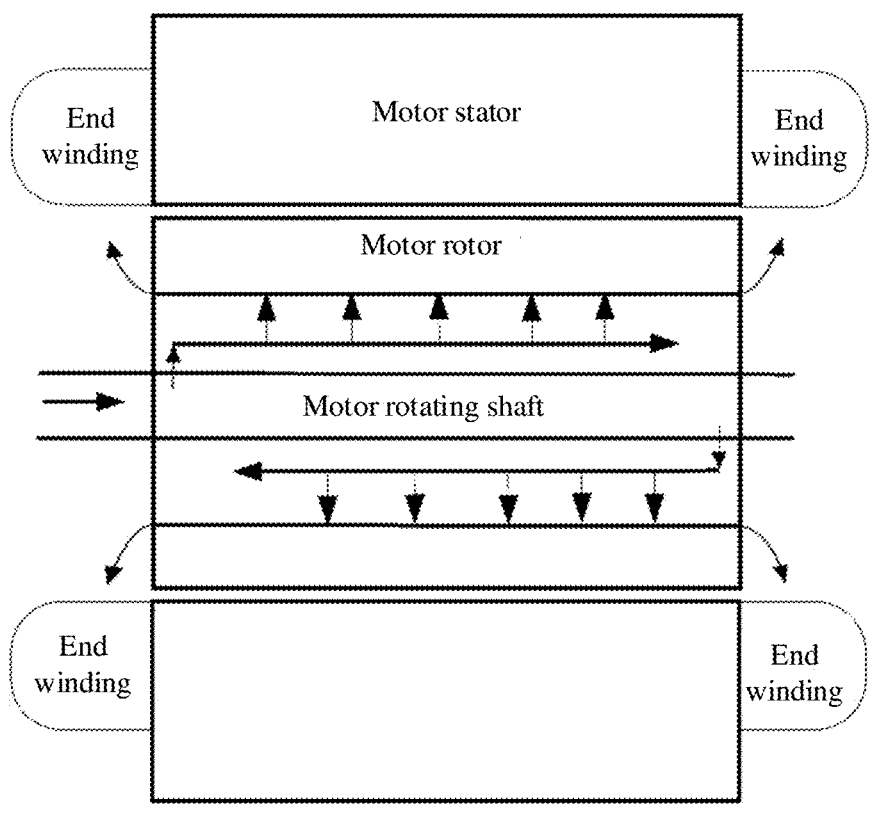
FIG. 5B is a schematic diagram of a second flow path of cooling oil in a rotor according to an embodiment.

FIG. 5A is a schematic diagram of a first flow path of cooling oil in a rotor according to an embodiment. FIG. 5B is a schematic diagram of a second flow path of cooling oil in a rotor according to an embodiment. That is, in the rotor provided in this embodiment, the cooling oil may flow in the following two modes:

Mode 1: Outer side first and inner side second. The cooling oil may first flow to an outer side of an oil passage on the motor rotor away from the motor rotating shaft and then spread to an inner side of the oil passage close to the motor rotating shaft. As shown in FIG. 5A, the oil in the hollow channel of the rotating shaft may first enter the outer side of the oil passage through a first runner. With increase of an oil intake amount, the cooling oil in the oil passage continuously accumulates under the action of centrifugal force, and a liquid level moves towards an inner layer, that is, a cooling oil accumulation process in an axial oil passage of the rotor is radial flow. In addition, the cooling oil forms an oil film with a uniform thickness in an axial direction of the oil passage, and gradually spreads to the inner side of the oil passage. An oil accumulation level in the oil passage reaches an outlet, and then the cooling oil is thrown out through a second runner that connects to the outside of the rotor at two ends of the rotor.

Mode 2: Inner side first and outer side second. That is, the cooling oil first flows to an inner side of an oil passage on the motor rotor close to the motor rotating shaft, and then spreads to an outer side of the oil passage away from the motor rotating shaft. As shown in FIG. 5B, the oil in the hollow channel of the rotating shaft may first enter the inner side of the oil passage through a first runner. With increase of an oil intake amount, the cooling oil in the oil passage continuously accumulates, and a liquid level moves towards an outer layer, that is, a cooling oil accumulation process in an axial oil passage of the rotor is radial flow. In addition, the cooling oil forms an oil film with a uniform thickness in an axial direction of the oil passage, and gradually spreads to the outer side of the oil passage, so that the cooling oil is thrown out through a second runner that connects the outer side of the rotating shaft to the outside of the end plate at two ends of the rotor.

The following may describe several example structures of the rotor provided in the embodiments with reference to the accompanying drawings.

Figure 6A:
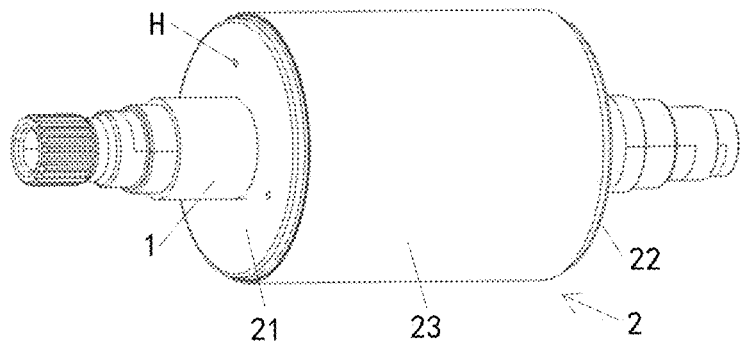
FIG. 6A is a schematic diagram of an assembly structure of a rotor according to a first embodiment.
Figure 6B:
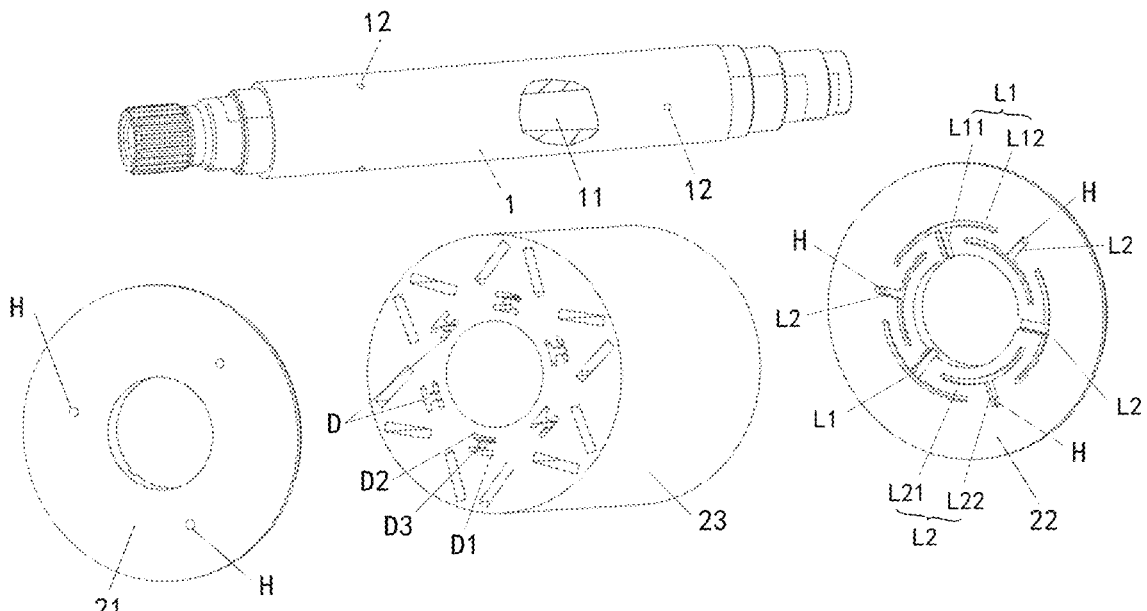
FIG. 6B is a schematic diagram of an example exploded structure of the rotor shown in FIG. 6A.

FIG. 6A is a schematic diagram of an assembly structure of a rotor according to a first embodiment. FIG. 6B is a schematic diagram of an example exploded structure of the rotor shown in FIG. 6A. As shown in FIG. 6A and FIG. 6B, the rotor includes a rotating shaft 1 and a rotor iron core assembly 2. The rotating shaft 1 has a hollow channel 11, where a plurality of oil holes 12 may be spaced along a circumferential direction on an outer wall of at least one end of the rotating shaft 1, and each oil hole 12 is connected to the hollow channel 11. The rotor iron core assembly 2 is sleeved on the rotating shaft 1, and includes a first end plate 21, a second end plate 22, and an iron core body 23 located between the first end plate 21 and the second end plate 22.

The hollow channel 11 extends along an axial direction, and the oil hole 12 extends along a radial direction. A plurality of first runners L1 and a plurality of second runners L2 are respectively disposed along the circumferential direction on inner sides of the first end plate 21 and the second end plate 22 that face the iron core body 23, the plurality of oil holes 12 at one end of the rotating shaft 1 may be connected to the plurality of first runners L1 on one of the first end plate 21 and the second end plate 22 in a one-to-one correspondence, the plurality of second runners L2 may be separately connected to the outside of the rotor iron core assembly 2, and each first runner L1 and each second runner L2 are spaced along the circumferential direction and the radial direction and are not connected.

A plurality of oil passages D may be disposed on the iron core body 23 at intervals along the circumferential direction, each oil passage D runs through the iron core body 23 along the axial direction, and ports at two ends of each oil passage D along the axial direction each include an outer portion away from the rotating shaft 1 along the radial direction and an inner portion close to the rotating shaft 1 along the radial direction. If either the plurality of first runners L1 or the plurality of second runners L2 may be respectively connected to outer portions of ports of the plurality of oil passages D, the plurality of second runners L2 or the plurality of first runners L1 may be respectively connected to inner portions of the ports of the plurality of oil passages D. The following two cases may be included:

Case 1: The plurality of first runners L1 may be respectively connected to the outer portions of the ports of the plurality of oil passages D, and the plurality of second runners L2 may be respectively connected to the inner portions of the ports of the plurality of oil passages D. In this case, a flow mode of cooling oil is outer side first and inner side second, that is, the cooling oil first flows to an outer side of the oil passage and then spreads to an inner side of the oil passage, as shown in FIG. 6B.

Case 2: The plurality of first runners L1 may be respectively connected to the inner portions of the ports of the plurality of oil passages D, and the plurality of second runners L2 may be respectively connected to the outer portions of the ports of the plurality of oil passages D. In this case, a flow mode of cooling oil is inner side first and outer side second, that is, the cooling oil first flows to an inner side of the oil passage and then spreads to an outer side of the oil passage.

Further, the iron core body 23 may include a plurality of silicon steel sheets arranged along the axial direction, that is, the iron core body 23 is formed by stacking the silicon steel sheets. A plurality of "splay" axial channels may be disposed at a position close to an outer circumference on the iron core body 23, and may be used to install magnetic steel, that is, the magnetic steel is disposed on an outer side of the rotor.

According to the rotor in this embodiment, each first runner L1 and each second runner L2 on the end plate are spaced along the circumferential direction and the radial direction and are not connected, the first runner L1 is connected to the oil hole 12 of the rotating shaft 1, and the second runner L2 is connected to the outside of the end plate. In this way, when the first runner L1 and the second runner L2 are respectively connected to two sides (that is, the outer portion and the inner portion) of the port of the oil passage along the radial direction, cooling oil in the hollow channel 11 of the rotating shaft 1 may enter one side (that is, the outer portion or the inner portion) of the oil passage D through the oil hole 12 and the first runner L1, and does not interfere with the second runner L2, and the cooling oil entering the oil passage D spreads along the radial direction after being spread along the axial direction (for example, from the outer portion of the port to the inner portion of the port, or from the inner portion of the port to the outer portion of the port). In this way, thicknesses of oil films in the oil passages D can be basically consistent, so that oil amounts entering the second runner L2 from the other side (the inner portion or the outer portion) of the ports at two ends of the rotor iron core assembly 2 are not greatly different, and when being thrown out from the rotor iron core assembly 2 through the second runner L2, the cooling oil does not interfere with oil inlet of the first runner L1, thereby ensuring even oil throwing, avoiding a local hot spot, and improving performance of the motor.

In FIG. 6B, the oil passage D includes a first channel D1, a third channel D3, and a second channel D2 that are arranged in sequence close to the rotating shaft 1 along the radial direction and that run through the iron core body 23 along the axial direction. A port of the first channel D1 is the outer portion, a port of the second channel D2 is the inner portion, an outer side of the third channel D3 away from the rotating shaft 1 is connected to the first channel D1, an inner side of the third channel D3 close to the rotating shaft 1 is connected to the second channel D2, and a width of the third channel D3 along the circumferential direction is less than a width of each of the first channel D1 and the second channel D2 along the circumferential direction, so that a cross section of the oil passage D is I-shaped.

Figure 7:
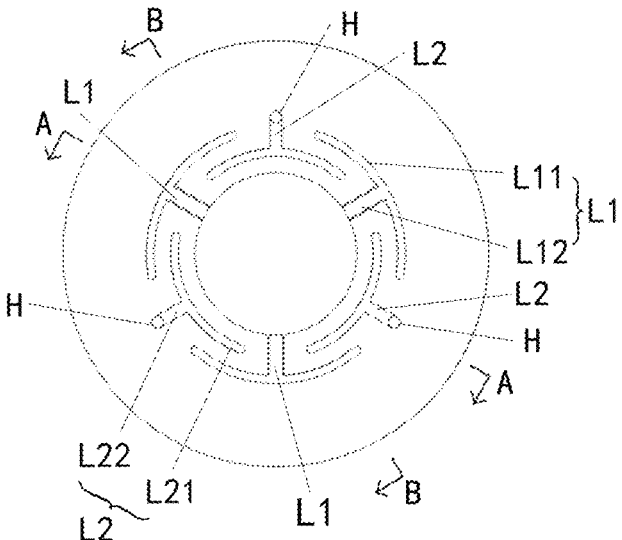
FIG. 7 is a schematic diagram of a structure of a first end plate and a second end plate of the rotor shown in FIG. 6A and FIG. 6B.

FIG. 7 is a schematic diagram of a structure of a first end plate and a second end plate of the rotor shown in FIG. 6A and FIG. 6B. As shown in FIG. 7 and FIG. 6B, the first runner L1 may include a first arc-shaped section L11 and a first radial section L12. The first arc-shaped section L11 extends along the circumferential direction of the rotor iron core assembly 2. One end of the first radial section L12 may be connected to the first arc-shaped section L11, and the other end of the first radial section L12 may extend to an inner circumferential wall of the rotor iron core assembly 2 along the radial direction towards the rotating shaft 1 and may be connected to the oil hole 12. The second runner L2 may include a second arc-shaped section L21 and a second radial section L22. The second arc-shaped section L21 extends along the circumferential direction of the rotor iron core assembly 2. The second radial section L22 is connected to the second arc-shaped section L21 and extends along the radial direction away from the rotating shaft 1. An oil throwing hole H connected to the outside is disposed on the second radial section L22.

In addition, two ends of the first arc-shaped section L11 of each first runner L1 may be respectively connected to two adjacent oil passages D along the circumferential direction. Two ends of each second arc-shaped section L21 may be respectively connected to two adjacent oil passages D along the circumferential direction. Further, when one first runner L1 is connected to two oil passages D, one end of the first radial section L12 away from the rotating shaft 1 may be connected to the middle of the first arc-shaped section L11 along a bending direction, and two ends of the first arc-shaped section L11 may be respectively connected to two adjacent oil passages D along the circumferential direction. In addition, in other embodiments, first arc-shaped sections L11 of the plurality of first runners L1 are connected to the plurality of oil passages D in a one-to-one correspondence. Second arc-shaped sections L21 of the plurality of second runners L2 may be connected to the oil passages D in a one-to-one correspondence. That is, each first runner L1 is connected to at least one oil passage D, and each second runner L2 is connected to at least one oil passage D.

In addition, the first arc-shaped section L11 of the first runner L1 and the second arc-shaped section L21 of the second runner L2 are spaced along the radial direction. In FIG. 7, relative to the second arc-shaped section L21 of the second runner L2, the first arc-shaped section L11 of the first runner L1 is away from the rotating shaft 1 along the radial direction, and the first arc-shaped sections L11 of the plurality of first runners L1 may be respectively connected to the outer portions of the ports of the plurality of oil passages D, that is, the first channel DE The second arc-shaped sections L21 of the plurality of second runners L2 may be respectively connected to the inner portions of the ports of the plurality of oil passages D, that is, the second channel D2. In this case, the flow mode of the cooling oil is the mode 1, that is, outer side first and inner side second, that is, the cooling oil first flows to the outer side of the oil passage D/the first channel D1, and then spreads to the inner side of the oil passage D/the second channel D2 through the third channel D3.

In other embodiments, the plurality of first runners L1 may be respectively connected to the inner portions, that is, the second channel D2, of the ports of the plurality of oil passages D, and the plurality of second runners L2 may be respectively connected to the outer portions, that is, the first channel D1, of the ports of the plurality of oil passages D. In this case, the flow mode of the cooling oil is the mode 2, that is, inner side first and outer side second, that is, the cooling oil first flows to the inner side of the oil passage/the second channel D2, and then spreads to the outer side of the oil passage/the first channel D1 through the third channel D3. When a side of the oil passage D close to the rotating shaft 1 is closed, the foregoing structure of the first runner L1 may also be used, that is, the first runner L1 may include the first arc-shaped section L11 and the first radial section L12, where the first radial section L12 is connected to the oil hole 11 of the rotating shaft 1, and the first arc-shaped section L11 of the first runner L1 is close to the rotating shaft 1 along the radial direction relative to the second arc-shaped section L21 of the second runner L2. When a side of the oil passage D close to the rotating shaft 1 is open, the first runner L1 may include only the first arc-shaped section L11, where the first arc-shaped section L11 is connected to the oil hole 11 of the rotating shaft 1, and the first arc-shaped section L1 may also be in another shape, for example, a rectangle. In addition, the first arc-shaped section L1 may be connected to one oil passage D, and may be connected to three or more oil passages D.

Figure 8:
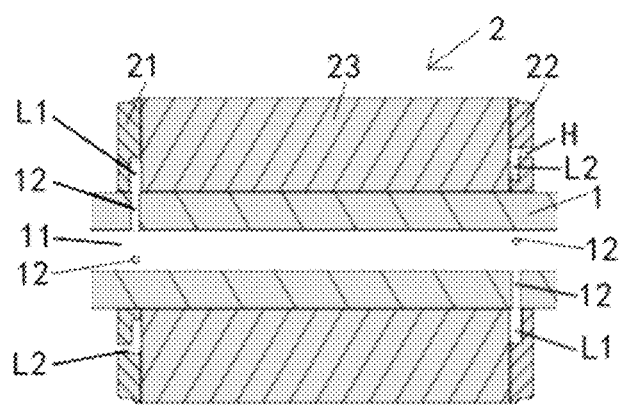
FIG. 8 is a schematic diagram of a partial sectional view of the rotor shown in FIG. 6A on an iron core body along a line A-A in FIG. 7.

FIG. 8 is a schematic diagram of a partial sectional view of the rotor shown in FIG. 6A on an iron core body along a line A-A in FIG. 7. As shown in FIG. 8, the oil hole 12 on the rotating shaft 1 is connected to the hollow channel 11, and the first runner L1 is connected to the oil hole 12. The second runner L2 on the first end plate 21 is connected to the outside of the first end plate 21, and the second runner L2 on the second end plate 22 is connected to the outside of the second end plate 22.

Figure 9:
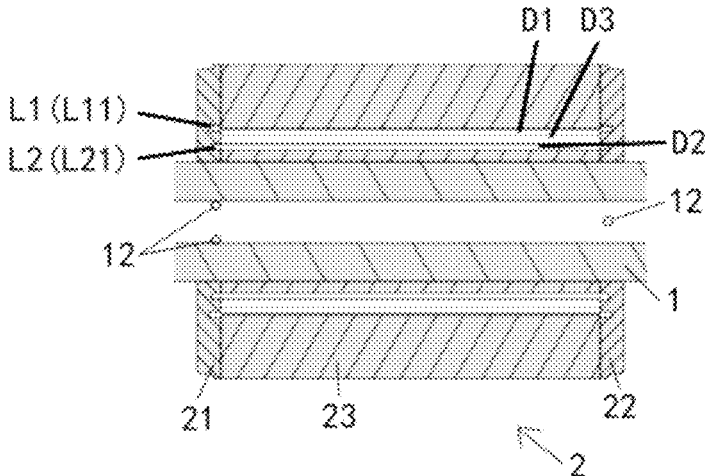
FIG. 9 is a schematic diagram of a partial sectional view of the rotor shown in FIG. 6A on an iron core body along a line B-B in FIG. 7.

FIG. 9 is a schematic diagram of a partial sectional view of the rotor shown in FIG. 6A on an iron core body along a line B-B in FIG. 7. As shown in FIG. 9, the first arc-shaped section L11 of the first runner L1 is connected to the outer portion of the port of the oil passage D, that is, the first channel D1, and the second arc-shaped section L21 of the second runner L2 is connected to the inner portion of the port of the oil passage D, that is, the second channel D2.

Figure 10:
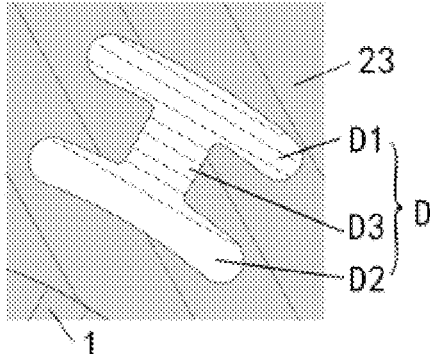
FIG. 10 is a schematic transverse sectional view of a local structure of the rotor shown in FIG. 6A on an iron core body.

FIG. 10 is a schematic transverse sectional view of a local structure of the rotor shown in FIG. 6A on an iron core body. As shown in FIG. 10, a cross section of the oil passage D is I-shaped, and the oil passage D includes a first channel D1, a third channel D3, and a second channel D2 in sequence close to the rotating shaft 1 along the radial direction. The flow mode of the cooling oil is the mode 1, that is, the cooling oil first flows to the outer side of the oil passage D, that is, the first channel D1, and then spreads to the inner side of the oil passage, that is, the second channel D2 through the third channel D3. That is, to avoid a heat dissipation risk caused by uneven oil throwing of the rotor, oil throwing of the rotating shaft 1 first enters the first channel D1 on the outer side of the oil passage D on the iron core body 23. The cooling oil in the oil passage D continuously accumulates under the action of centrifugal force, and a liquid level moves towards an inner layer, that is, a cooling oil accumulation process in an axial oil passage D of the rotor is radial flow. In addition, the cooling oil forms an oil film with a uniform thickness in an axial direction of the oil passage D, and gradually spreads to the second channel D2 on the inner side of the oil passage D. An oil accumulation level in the oil passage reaches a specified outlet, that is, the oil throwing hole H of the second runner L2, and the cooling oil is evenly thrown out from the oil throwing holes H at two ends.

Figure 11:
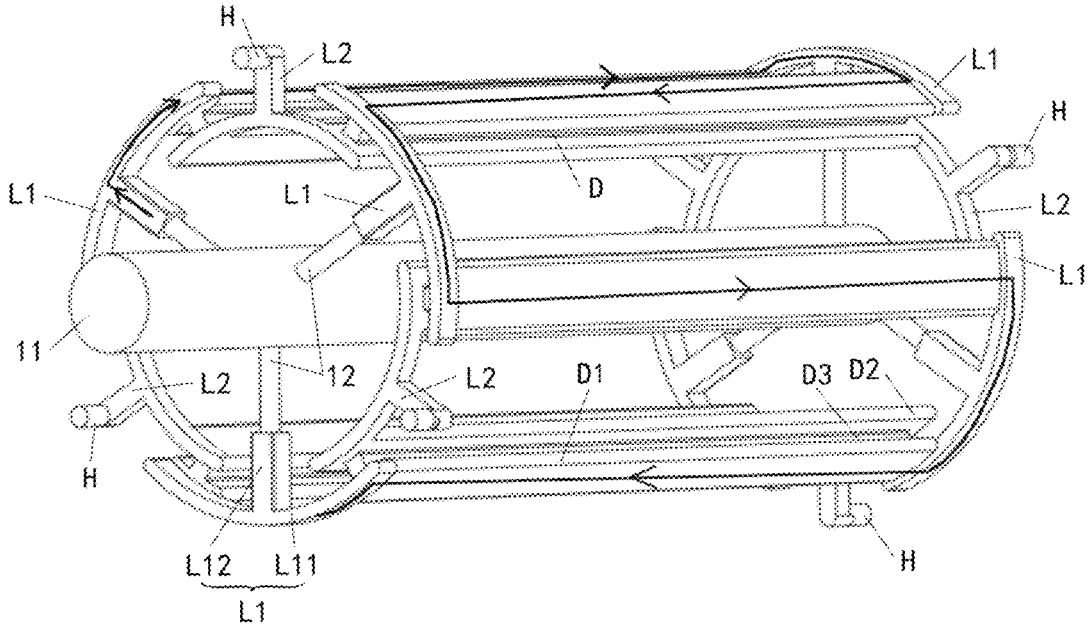
FIG. 11 is a schematic diagram of a flow path of cooling oil in the rotor shown in FIG. 6A.

FIG. 11 is a schematic diagram of a flow path of cooling oil in the rotor shown in FIG. 6A. As shown in FIG. 11, respective first runners L1 on the first end plate 21 and the second end plate 22 are connected to the oil hole 12 and first channels D1 of two adjacent oil passages D, and respective second runners L2 on the first end plate 21 and the second end plate 22 have an oil throwing hole H, and are connected to second channels D2 of two adjacent oil passages D. The first runner L1 at one end of the oil passage D, that is, the first end plate 21, and the second runner L2 at the other end of the oil passage D, that is, the second end plate 22, are correspondingly disposed. The second runner L2 at one end of the oil passage D, that is, the first end plate 21, and the first runner L1 at the other end of the oil passage D, that is, the second end plate 22, are correspondingly disposed. In this case, the first end plate 21 and the second end plate 22 are disposed in a staggered manner, and the plurality of oil passages D may be connected, to form an S-shaped cooling path.

When the rotor rotates, the cooling oil may enter the first runner L1 on the end plate from the hollow channel 11 of the rotating shaft 1 through the oil hole 12 and the first runner L1 may be connected to the outer side of the oil passage D, that is, the first channel DE After the cooling oil enters the first channel D1, the cooling oil generates axial flow inside the oil passage D under the action of the centrifugal force and may flow from one end of the first channel D1 to the other end. Because the end plates at two ends of the rotor are installed in a staggered manner, first channels D1 on outer sides of the plurality of oil passages D are connected through the first runner L1 of the end plate, and finally, a circumferential S-shaped series oil path flowing through the oil passage D and the first runner L1 shown by an arrow in FIG. 11 is formed on the outer side of the rotor runner.

Because flow directions of the S-shaped series oil path in adjacent oil passages D may be staggered, even if oil holes 12 at two ends of the rotating shaft 1 throw oil unevenly, thicknesses of oil films at various positions of an S-shaped runner may be the same. As shown in FIG. 10, with accumulation of oil and centrifugal force, the cooling oil moves from outside to inside along the radial direction in the oil passage D, and is filled with the first channel D1, the third channel D3, and the second channel D2 in sequence, so that the oil passage D is fully filled with the cooling oil, thereby implementing pure liquid cooling. In addition, in the entire oil passage D, liquid level positions at front and rear ends are the same. As shown in FIG. 11, when the liquid level in FIG. 10 is filled with the second channel D2, the cooling oil enters the second runner L2 connected to the second channel D2, and then the cooling oil is thrown out by using the oil throwing holes H of the second runner L2 at two ends of the rotor at a same flow rate.

Figure 12:
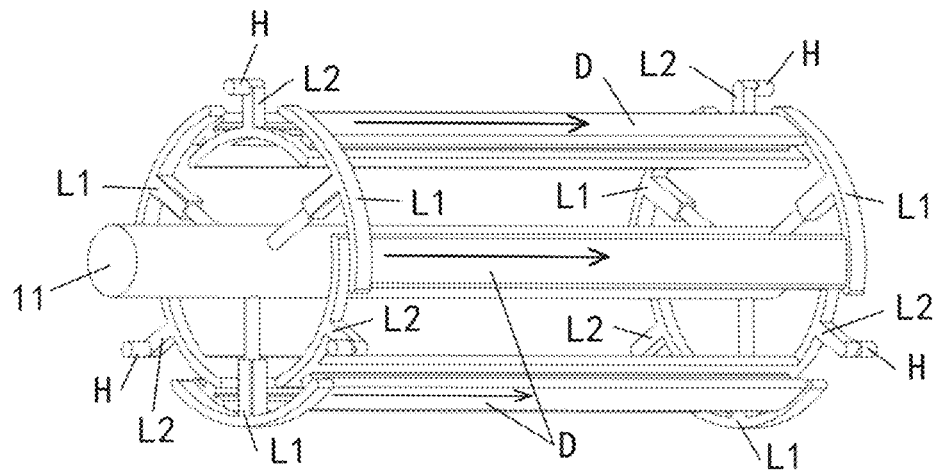
FIG. 12 is a schematic diagram of a flow path of cooling oil in a variant structure of the rotor shown in FIG. 6A.

FIG. 12 is a schematic diagram of a flow path of cooling oil in a variant structure of the rotor shown in FIG. 6A. A difference from the structure of the rotor shown in FIG. 11 lies in that, in FIG. 12, the first runner L1 at one end of the oil passage D, that is, the first end plate 21, and the first runner L1 at the other end of the oil passage D, that is, the second end plate 22, are correspondingly disposed, and the second runner L2 at one end of the oil passage D, that is, the first end plate 21, and the second runner L2 at the other end of the oil passage D, that is, the second end plate 22, are correspondingly disposed. That is, the first end plate 21 and the second end plate 22 are not disposed in a staggered manner, and the first end plate 21 and the second end plate 22 are installed at a same angle and are disposed opposite to each other. In this case, a straight-line cooling path shown by an arrow in FIG. 12 is formed. Compared with the S-shaped series oil path shown in FIG. 11, in FIG. 12, the cooling oil flows unidirectionally along the axial direction in all oil passages D, which can also implement even flow distribution at front and rear ends of the oil passage D, thereby ensuring even oil throwing at two ends of the rotor.

Figure 13:
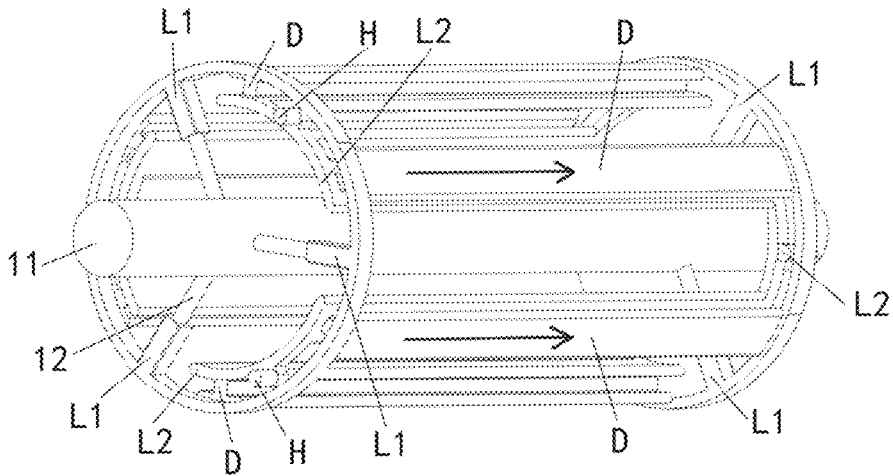
FIG. 13 is a schematic diagram of a flow path of cooling oil in a variant structure of the rotor shown in FIG. 12.

FIG. 13 is a schematic diagram of a flow path of cooling oil in a variant structure of the rotor shown in FIG. 12. A difference from the structure of the rotor shown in FIG. 12 lies in that, in FIG. 13, first arc-shaped sections L11 of the plurality of first runners L1 may be connected to form a closed ring. The closed ring is connected to all oil passages D. In addition, the same as the rotor shown in FIG. 12, the first end plate 21 and the second end plate 22 are not disposed in a staggered manner, and the cooling path is a straight line shown by an arrow in FIG. 13.

Figure 14:
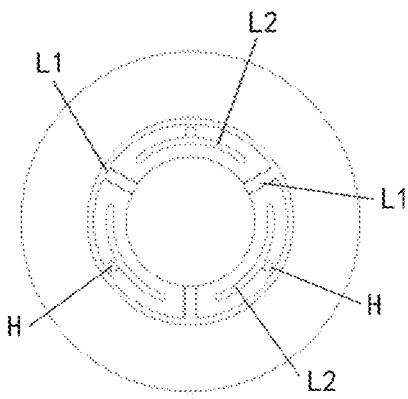
FIG. 14 is a schematic diagram of a structure of a first end plate and a second end plate of the rotor shown in FIG. 13.

FIG. 14 is a schematic diagram of a structure of a first end plate and a second end plate of the rotor shown in FIG. 13. As shown in FIG. 14, first arc-shaped sections L11 of the plurality of first runners L1 may be connected to form a closed ring. In addition, the second runner L2 is located on an inner side of the closed ring. In this case, oil first enters the outer side of the oil passage D through the plurality of first runners L1, then spreads to the inner side of the oil passage D and is thrown out from the inner side of the oil passage D through the second runner L2. In other embodiments, the second runner L2 may be located on an outer side of the closed ring. In this case, oil first enters the inner side of the oil passage D through the plurality of first runners L1, then spreads to the outer side of the oil passage D and is thrown out from the outer side of the oil passage D through the second runner L2.

Figure 15:
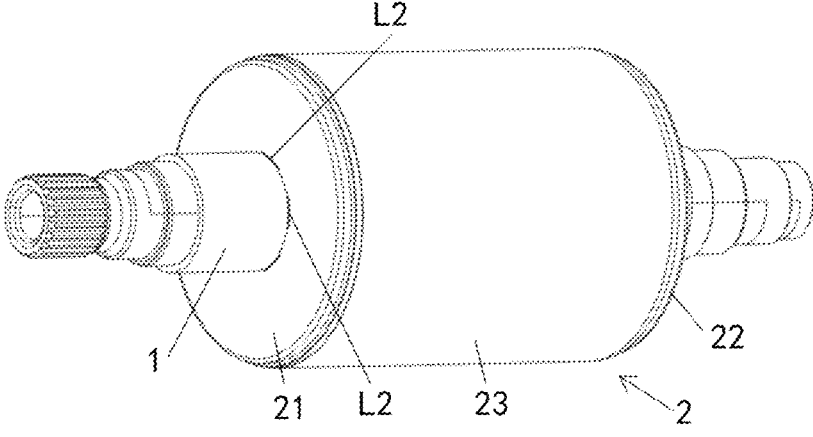
FIG. 15 is a schematic diagram of an assembly structure of a rotor according to a second embodiment.
Figure 16:
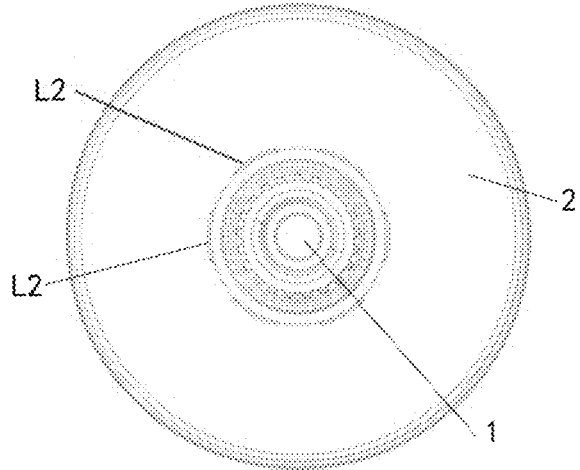
FIG. 16 is a schematic diagram of a structure of a left view of the rotor shown in FIG. 15.

FIG. 15 is a schematic diagram of an assembly structure of a rotor according to a second embodiment. FIG. 16 is a schematic diagram of a structure of a left view of the rotor shown in FIG. 15. As shown in FIG. 15 and FIG. 16, the second runner L2 is a through opening, and is formed by fitting a groove on the end plate with an outer surface of the rotating shaft 1.

Figure 17:
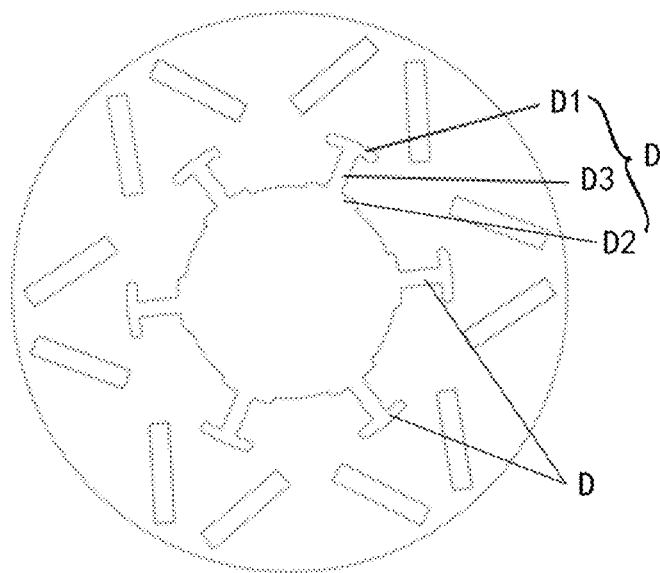
FIG. 17 is a schematic diagram of a structure of an iron core body of the rotor shown in FIG. 15 or a silicon steel sheet of an iron core body.
Figure 18:
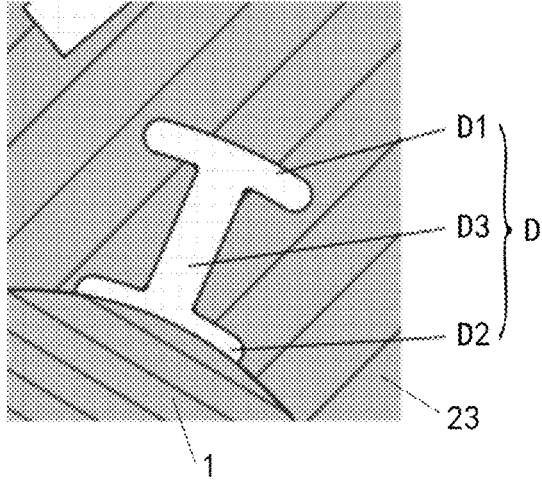
FIG. 18 is a schematic transverse sectional view of a local structure of the rotor shown in FIG. 15 on an iron core body.

FIG. 17 is a schematic diagram of a structure of an iron core body of the rotor shown in FIG. 15 or a silicon steel sheet of an iron core body. FIG. 18 is a schematic transverse sectional view of a local structure of the rotor shown in FIG. 15 on an iron core body. As shown in FIG. 17, the oil passage D is I-shaped, and a side close to the rotating shaft 1 is open. The oil passage D may include a first channel D1, a second channel D2, and a third channel D3 in sequence close to the rotating shaft 1 along the radial direction. In this case, a side of the second channel D2 close to the rotating shaft 1 is open and is connected to an inner wall of the rotor core assembly 2. As shown in FIG. 18, an outer circumferential wall of the rotating shaft 1 cooperates with an open side of the oil passage D to form the second channel D2 of the oil passage D.

Figure 19:
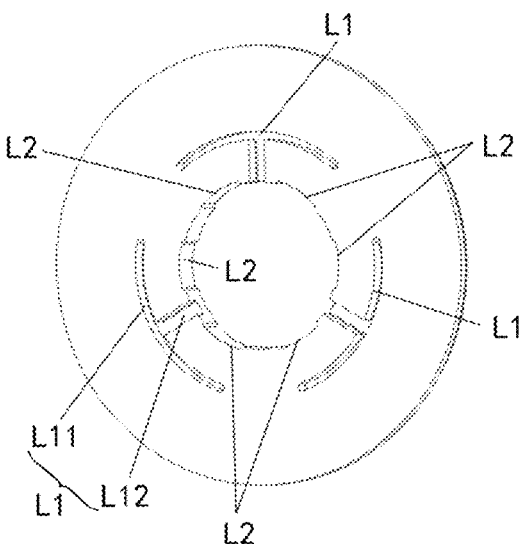
FIG. 19 is a schematic diagram of a structure of a first end plate and a second end plate of the rotor shown in FIG. 15.

FIG. 19 is a schematic diagram of a structure of a first end plate and a second end plate of the rotor shown in FIG. 15. As shown in FIG. 19, the first runner L1 may include a first arc-shaped section L11 and a first radial section L12. The second runner L2 includes a through opening disposed on the first end plate 21 or the second end plate 22. One end of the through opening along the axial direction is connected to the outside, and the other end of the through opening along the axial direction is correspondingly connected to the oil passage D. A side of the through opening close to the rotating shaft 1 is open, and the through opening extends to the inner circumferential wall of the rotor iron core component 2 along the radial direction. That is, the through opening is changed to a groove, and two grooves between two adjacent first radial sections L12 are spaced or connected. In addition, in other embodiments, a side of the oil passage D close to the rotating shaft 1 may be closed. In this case, a side of the through opening close to the rotating shaft 1 is also closed.

That is, the second runner L2 may include a through opening disposed on the first end plate 21 or the second end plate 22. One end of the through opening along the axial direction is connected to the outside, and the other end of the through opening along the axial direction is correspondingly connected to the oil passage D. A side of the through opening close to the rotating shaft 1 may be open or closed, which can be selected according to a flow mode of the cooling oil and whether a side of the oil passage D close to the rotating shaft 1 is open or closed.

Figure 20:
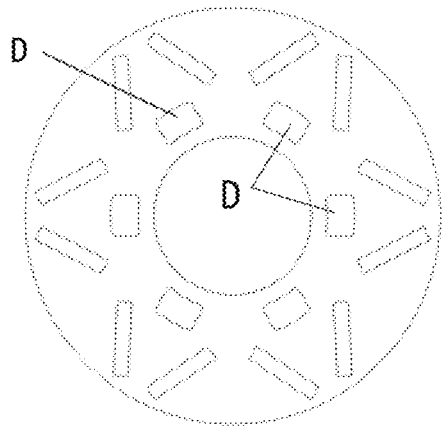
FIG. 20 is a schematic diagram of a structure of an iron core body of a rotor or a silicon steel sheet of an iron core body according to a third embodiment.
Figure 21:
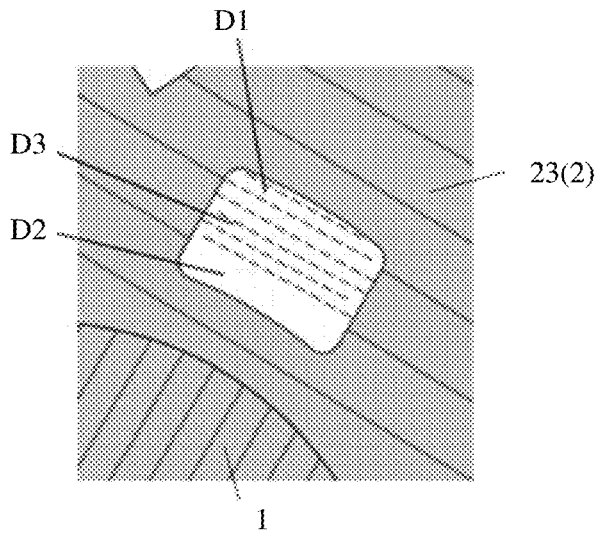
FIG. 21 is a schematic transverse sectional view of a local structure of a rotor on an iron core body according to a third embodiment.

FIG. 20 is a schematic diagram of a structure of an iron core body of a rotor or a silicon steel sheet of an iron core body according to a third embodiment. FIG. 21 is a schematic transverse sectional view of a local structure of a rotor on an iron core body according to a third embodiment. As shown in FIG. 20, a cross section of the oil passage D is a rectangle. Further, two opposite sides of the rectangle may be arc-shaped. As shown in FIG. 21, an outer portion of the oil passage D whose cross section is a rectangle away from the rotating shaft 1 along the radial direction is a first channel D1, an inner portion close to the rotating shaft 1 is a second channel D2, and a part located between the first channel D1 and the second channel D2 and connected to the first channel D1 and the second channel D2 is D3. On the iron core body 23, the cooling oil is gradually accumulated from the first channel D1 towards the second channel D2.

That is, a shape of the cross section of the oil passage D on the iron core body 23 may be an I-shaped shape, or may be a rectangle, or may be another shape as required. The shape of the oil passage D on the iron core body 23 may not be limited, and an opening structure with a larger size in the radial direction can be used as a deformation of the oil passage D on the iron core body 23. For example, in an embodiment to be described in FIG. 23 below, a middle cross section of the oil passage D may be I-shaped, and another part of the cross section may be in a shape of two parallel line segments. In addition, a side of the oil passage D close to the rotating shaft 1 may be open or closed, and correspondingly, a side of the oil passage D close to the rotating shaft 1 may be closed or open.

Figure 22:
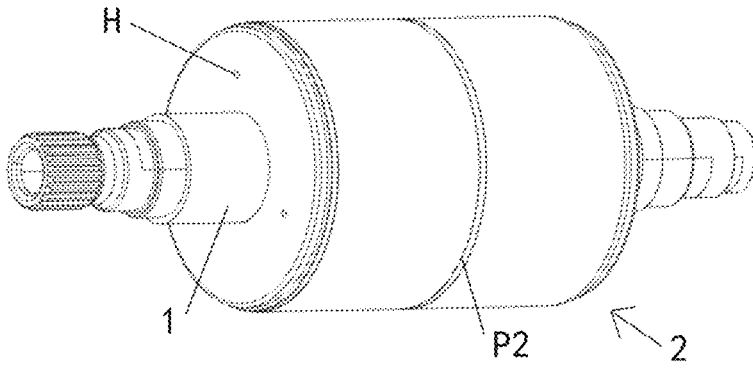
FIG. 22 is a schematic diagram of an assembly structure of a rotor according to a fourth embodiment.
Figure 23:
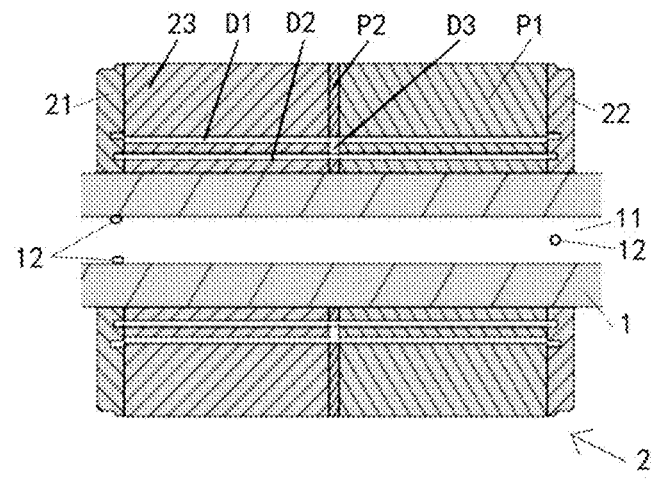
FIG. 23 is a schematic longitudinal sectional view of a local structure of the rotor shown in FIG. 22 on an iron core body.

FIG. 22 is a schematic diagram of an assembly structure of a rotor according to a fourth embodiment. FIG. 23 is a schematic longitudinal sectional view of a local structure of the rotor shown in FIG. 22 on an iron core body. As shown in FIG. 23, the oil passage D includes a first channel D1, a third channel D3, and a second channel D2 that are arranged in sequence close to the rotating shaft 1 along the radial direction. The first channel D1 runs through the iron core body 23 along the axial direction. The second channel D2 extends from one end of the iron core body 23 to the middle or the other end of the iron core body 23 along the axial direction. A port of the first channel D1 is the outer portion, a port of the second channel D2 is the inner portion, an outer side of the third channel D3 away from the rotating shaft 1 is connected to the first channel D1, an inner side of the third channel D3 close to the rotating shaft 1 is connected to the second channel D2, the third channel D3 is located in the middle of the iron core body 23 along the axial direction, and a width of the third channel D3 along the circumferential direction is less than a width of each of the first channel D1 and the second channel D2 along the circumferential direction, so that a cross section of the oil passage D on the third channel D3 is I-shaped, and a cross section of the oil passage D a part other than the third channel D3 is in a shape of two parallel line segments.

Figure 24:
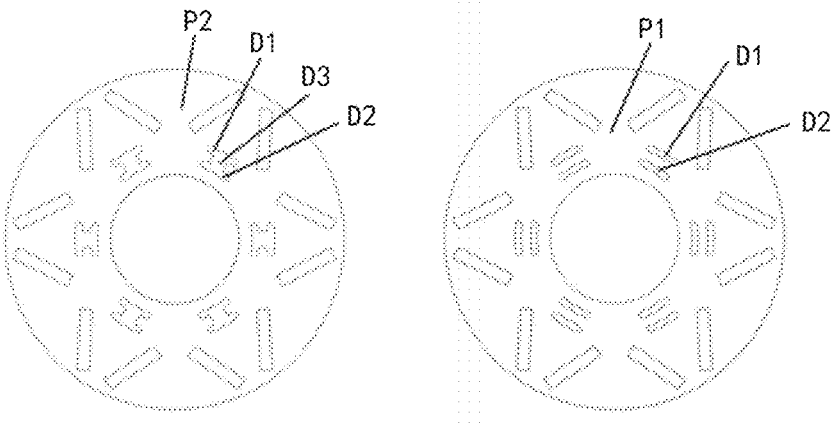
FIG. 24 is a schematic diagram of a structure of two types of silicon steel sheets of an iron core body of the rotor shown in FIG. 23.

FIG. 24 is a schematic diagram of a structure of two types of silicon steel sheets of an iron core body of the rotor shown in FIG. 23. As shown in FIG. 24, an oil passage D on a silicon steel sheet P2 shown in the left side view includes a first channel D1, a third channel D3, and a second channel D2, and an oil passage D on a silicon steel sheet P1 shown in the right side view includes a first channel D1 and a second channel D2. A quantity of layers of silicon steel sheets P2 may be located in the middle of the iron core body 23 and a plurality of silicon steel sheets P1 may be disposed on two sides respectively, to form the iron core body 23 shown in FIG. 23. In addition, similar to the rotor in the second embodiment shown in FIG. 18, in the rotor in the fourth embodiment shown in FIG. 22 to FIG. 24, a side of the second channel D2 on each of the silicon steel sheet P1 and the silicon steel sheet P2 close to the rotating shaft may also be opened, and cooperates with the rotating shaft to form the second channel D2.

Figure 25:
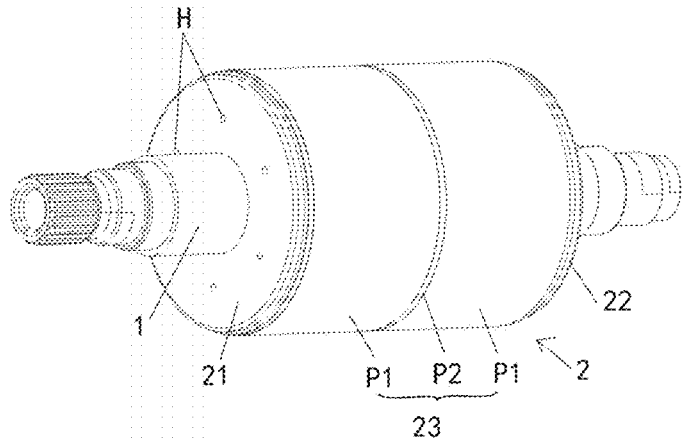
FIG. 25 is a schematic diagram of an assembly structure of a rotor according to a fifth embodiment.
Figure 26:
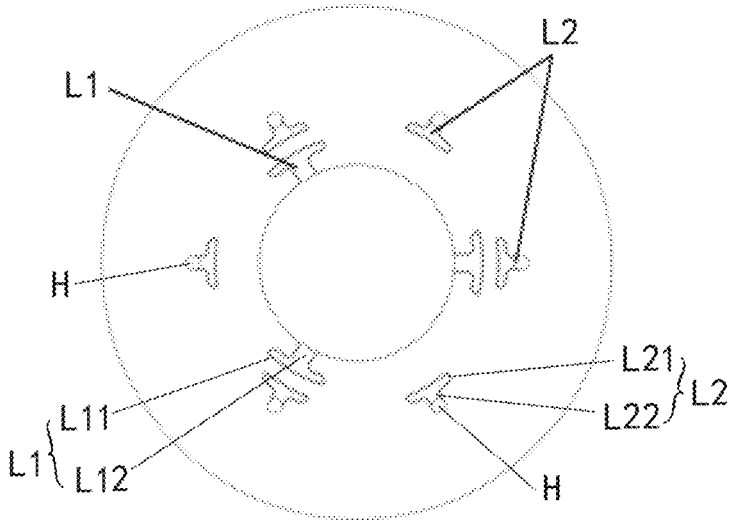
FIG. 26 is a schematic diagram of a structure of a first end plate and a second end plate of the rotor shown in FIG. 25.

FIG. 25 is a schematic diagram of an assembly structure of a rotor according to a fifth embodiment. FIG. 26 is a schematic diagram of a structure of a first end plate and a second end plate of the rotor shown in FIG. 25. As shown in FIG. 25 and FIG. 26, each first runner L1 is connected to one oil passage D, and each second runner L2 is connected to one oil passage D. In addition, in FIG. 26, the first arc-shaped section L11 of the first runner L1 is located on an inner side of the second arc-shaped section L21 of the second runner L2. In this case, the flow mode of the cooling oil is the mode 2, that is, inner side first and outer side second, that is, the cooling oil first flows to the inner side of the oil passage, that is, the second channel D2, spreads to the outer side of the oil passage, that is, the first channel D1, and is thrown out.

Figure 27:
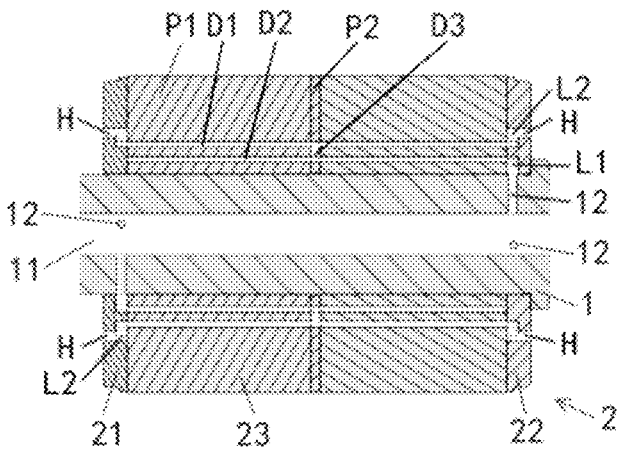
FIG. 27 is a schematic longitudinal sectional view of a local structure of the rotor shown in FIG. 25 on an iron core body.
Figure 28:
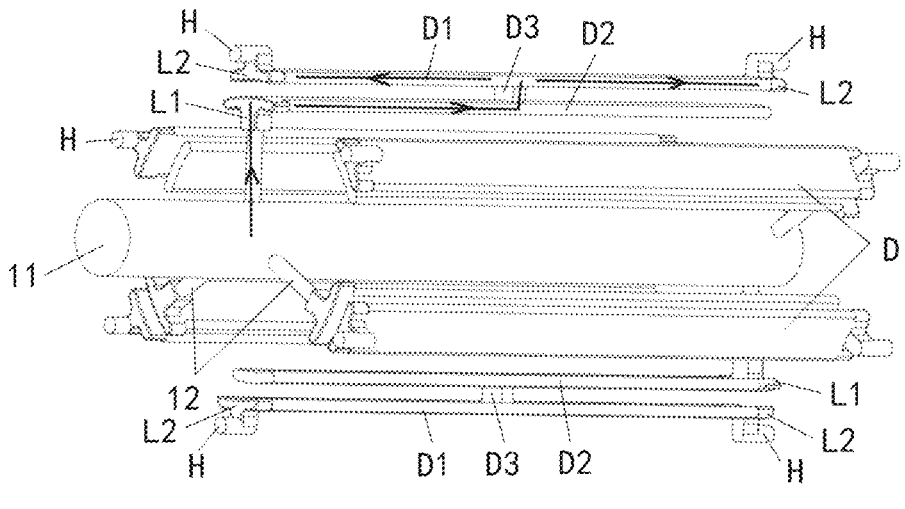
FIG. 28 is a schematic diagram of a flow path of cooling oil in the rotor shown in FIG. 25.

FIG. 27 is a schematic longitudinal sectional view of a local structure of the rotor shown in FIG. 25 on an iron core body. FIG. 28 is a schematic diagram of a flow path of cooling oil in the rotor shown in FIG. 25. As shown in FIG. 27 and FIG. 28, the oil hole 12 on the rotating shaft 1 is connected to the second channel D2 of the oil passage D on a side close to the rotating shaft 1 through the first runner L1, and the second runner L2 is connected to the first channel D1 of the oil passage D on a side away from the rotating shaft 1. The flow mode of the cooling oil is the mode 2, that is, the cooling oil first flows to the inner side of the oil passage/the second channel D2, and then spreads to the outer side of the oil passage/the first channel DE In addition, in FIG. 28, a middle cross section of the oil passage D is I-shaped, and cross sections of two ends are in a shape of two parallel line segments. In this case, the first runner L1 may be disposed only at one end of the second channel D2, and a length of the second channel D2 may be half of that of the first channel DE That is, one end of the second channel D2 is connected to the first runner L1, and the other end extends to the middle of the first channel D1 and needs to be connected to the third channel D3. Further, as shown in FIG. 28, the first runner L1 and the second runner L2 are disposed at one end of the first of two adjacent oil passages, and the second runner L2 is disposed at the other end. The second runner L2 is disposed at one end of the second of the two adjacent oil passages, and the first runner L1 and the second runner L2 are disposed at the other end. In this case, the first end plate 21 and the second end plate may be disposed in a staggered manner.

Further, when one first runner L1 is connected to one oil passage D, the first radial section L12 may be connected to the middle of the first arc-shaped section L11 for the flow mode of the cooling oil: inner side first and outer side second. In addition, in other embodiments, the first arc-shaped section L11 of the first runner L1 shown in FIG. 26 may be located an outer side the second arc-shaped section L21 of the second runner L2. In this case, the flow mode of the cooling oil is outer side first and inner side second, that is, the cooling oil first flows to the outer side of the oil passage D, that is, the first channel D1, and then spreads to the inner side of the oil passage D, that is, the second channel D2. In addition, when one first runner L1 is connected to one oil passage D, one end of the first arc-shaped section L11 may be connected to the oil passage D and the other end may be connected to the first radial section L12 for the flow mode of the cooling oil: outer side first and inner side second, that is, the first radial section L12 may be connected to the end of the first arc-shaped section L11.

Figure 29:
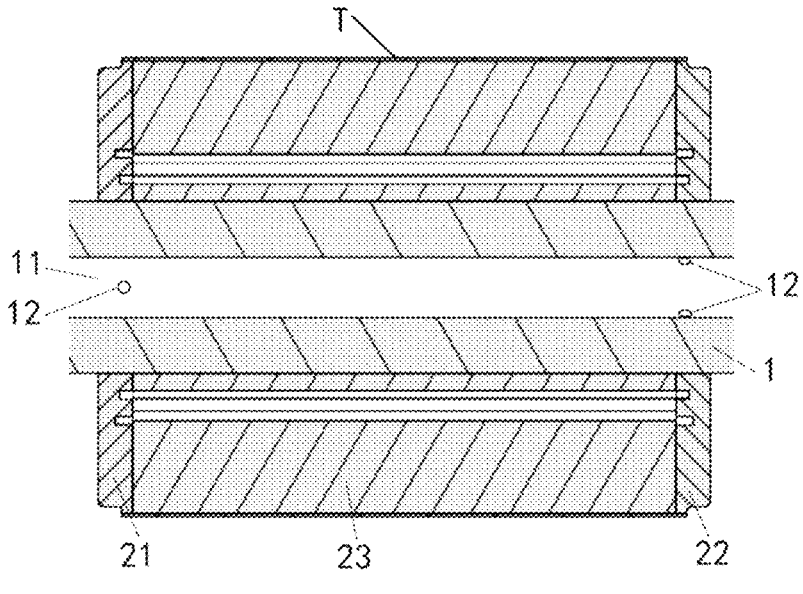
FIG. 29 is a schematic longitudinal sectional view of a local structure of a rotor on an iron core body according to a sixth embodiment.
Figure 30:
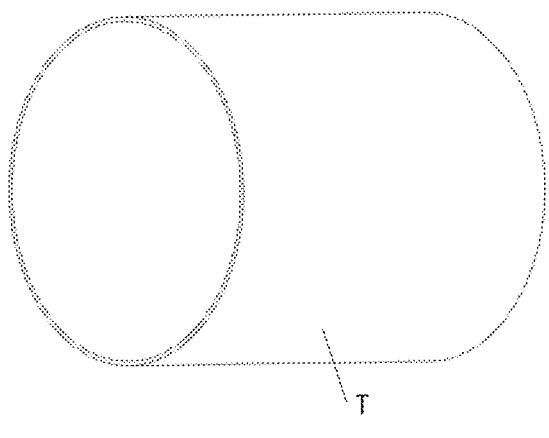
FIG. 30 is a schematic diagram of a three-dimensional structure of a sleeve of the rotor shown in FIG. 29.

FIG. 29 is a schematic longitudinal sectional view of a local structure of a rotor on an iron core body according to a sixth embodiment. FIG. 30 is a schematic diagram of a three-dimensional structure of a sleeve of the rotor shown in FIG. 29. As shown in FIG. 29 and FIG. 30, the rotor further includes a sleeve T. The sleeve T is disposed around an outer circumferential wall of the iron core assembly 2 of the rotor. The sleeve T covers a gap between the first end plate 21 and the iron core body 23, a gap between a plurality of silicon steel sheets of the iron core body 23, and a gap between the iron core body 23 and the second end plate 22. The material of the sleeve T may be carbon fiber or other high-strength material, which is covered on the surface of the rotor iron core assembly 2 by using a process.

In the rotor in the foregoing embodiments, because the iron core body 23 is formed by stacking silicon steel sheets, and two sides are pressed by using end plates, pressing force is large, and there are still gaps between the silicon steel sheets and between the silicon steel sheet and the end plate. When the oil in the oil passage of the rotor is used to promote an axial flow of cooling oil, oil leakage occurs in a radial gap during high-speed rotation of the rotor. A loss is increased when oil leakage enters an air gap, and a cooling effect is weakened. By coating an outer surface of the rotor iron core assembly 2 with a cylindrical sleeve T shown in FIG. 30, the sleeve T can cover the gap between the end plate and the iron core body 23 along the axial direction, that is, a problem that the cooling oil affects the loss and the cooling effect through the gap can be avoided.

In addition, in the rotor in the embodiments, the structures of the first end plate 21 and the second end plate 22 may have, but are not limited to, the following two solutions:

Solution 1: The first end plate 21 is of an integrated structure, and the second end plate 22 is of an integrated structure.

Solution 2: The first end plate 21 and the second end plate 22 each include at least a first silicon steel sheet and a second silicon steel sheet that are arranged along the axial direction, the second silicon steel sheet is located between the first silicon steel sheet and the iron core body 23, a through hole connected to the outside is disposed on the first silicon steel sheet, a first pattern and a second pattern are disposed on the second silicon steel sheet, a plate surface of the first silicon steel sheet and the first pattern form the first runner L1, and the plate surface of the first silicon steel sheet, the through hole, and the second pattern form the second runner L2, where when the plurality of first runners L1 and/or the plurality of second runners L2 may form a closed ring, the first silicon steel sheet is fixedly connected to the second silicon steel sheet.

In conclusion, in the rotor in the embodiments, related content of the first runner L1, the second runner L2, and the oil passage D may relate to the following aspects:

1. The first runner L1 may have, but is not limited to, the following two solutions:

Solution 1: The plurality of first runners L1 may be respectively connected to the outer portions of the ports of the plurality of oil passages D, and the plurality of second runners L2 may be respectively connected to the inner portions of the ports of the plurality of oil passages D; or the plurality of first runners L1 may be respectively connected to the inner portions of the ports of the plurality of oil passages D, and the plurality of second runners L2 may be respectively connected to the outer portions of the ports of the plurality of oil passages D, and a side of the oil passage D close to the rotating shaft 1 is closed. The first runner L1 includes a first arc-shaped section L11 and a first radial section L12. The first arc-shaped section L11 extends along a circumferential direction of the rotor iron core assembly 2, where the first arc-shaped section L11 is connected to the oil passage D in a one-to-one correspondence, or two ends of the first arc-shaped section L11 are respectively connected to two oil passages D that are adjacent along the circumferential direction. One end of the first radial section L12 is connected to the first arc-shaped section L11, and the other end of the first radial section L12 extends to an inner circumferential wall of the rotor iron core assembly 2 along the radial direction towards the rotating shaft 1, and is connected to the oil hole 12.

Solution 2: The plurality of first runners L1 may be respectively connected to the inner portions of the ports of the plurality of oil passages D, the plurality of second runners L2 may be respectively connected to the outer portions of the ports of the plurality of oil passages D, and a side of the oil passage D close to the rotating shaft 1 is open. The first runner L1 includes a first arc-shaped section L11, where a side of the first arc-shaped section L11 close to the rotating shaft 1 is open, and is connected to the oil hole 12. First arc-shaped sections L11 of the plurality of first runners L1 may be connected to the plurality of oil passages D in a one-to-one correspondence; or a first arc-shaped section L11 of each first runner L1 is separately connected to two oil passages D that are adjacent along the circumferential direction.

That is, the first runner L1 may include two solutions: Solution 1: The first runner L1 includes the first arc-shaped section L11 and the first radial section L12. Solution 2: The first runner L1 includes the first arc-shaped section L11. When the cooling oil first flows to the outer side of the oil passage D and then spreads to the inner side of the oil passage D, that is, "outer side first and inner side second", regardless of whether a side of the oil passage D close to the rotating shaft 1 is open or closed, the solution 1 may be selected for the first runner L1. When the cooling oil first flows to the inner side of the oil passage D and then spreads to the outer side of the oil passage D, that is, inner side first and outer side second, if a side of the oil passage D close to the rotating shaft 1 is closed, the solution 1 may be selected for the first runner L1; or if a side of the oil passage D close to the rotating shaft 1 is open, the solution 2 may be selected for the first runner L2.

In addition, in the foregoing two solutions, the first runner L1 may be connected to one oil passage D, or may be connected to two oil passages D. Further, first arc-shaped sections L11 of at least two first runners L1 are connected to form an arc-shaped structure; or the first arc-shaped sections L11 of the plurality of first runners L1 may be connected to form a closed ring.

2. The second runner L2 may have, but is not limited to, the following two solutions:

Solution 1: The second runner L2 includes a through opening disposed on the first end plate 21 or the second end plate 22, one end of the through opening along the axial direction is connected to the outside, and the other end of the through opening along the axial direction is correspondingly connected to the oil passage D. A side of the oil passage D close to the rotating shaft 1 is closed; or a side of the oil passage D close to the rotating shaft 1 is open, the plurality of first runners L1 may be respectively connected to the inner portions of the ports of the plurality of oil passages D, the plurality of second runners L2 may be respectively connected to the outer portions of the ports of the plurality of oil passages D, and a side of the through opening close to the rotating shaft 1 is closed; or a side of the oil passage D close to the rotating shaft 1 is open, the plurality of first runners L1 may be respectively connected to the outer portions of the ports of the plurality of oil passages D, the plurality of second runners L2 may be respectively connected to the inner portions of the ports of the plurality of oil passages D, a side of the through opening close to the rotating shaft 1 is open, and the through opening extends to the inner circumferential wall of the rotor iron core assembly 2 along the radial direction.

Solution 2: The second runner L2 includes a second arc-shaped section L21 and a second radial section L22. The second arc-shaped section L21 extends along a circumferential direction of the rotor iron core assembly 2, where the second arc-shaped section L21 is connected to the oil passage D in a one-to-one correspondence, or two ends of the second arc-shaped section L21 are respectively connected to two oil passages D that are adjacent along the circumferential direction. The second radial section L22 is connected to the second arc-shaped section L21 and extends along the radial direction away from the rotating shaft 1. An oil throwing hole H connected to the outside is disposed on the second radial section L22. In addition, the second arc-shaped section L21 and the first arc-shaped section L11 of the first runner L1 are spaced along the radial direction.

Further, the plurality of first runners L1 may be respectively connected to the outer portions of the ports of the plurality of oil passages D, the plurality of second runners L2 may be respectively connected to the inner portions of the ports of the plurality of oil passages D, the first arc-shaped section L11 is away from the rotating shaft 1 relative to the second arc-shaped section L21, and each second arc-shaped section L21 is located between first radial sections L12 of two adjacent first runners L1 along the circumferential direction. A side of the oil passage D close to the rotating shaft 1 is closed, and a side of the second arc-shaped section L21 of the second runner L2 close to the rotating shaft 1 is closed; or a side of the oil passage D close to the rotating shaft 1 is open, a side of the second arc-shaped section L21 of the second runner L2 close to the rotating shaft 1 is open, and the second arc-shaped section L21 extends to the inner circumferential wall of the rotor iron core assembly 2 along the radial direction.

In addition, the plurality of first runners L1 may be respectively connected to the inner portions of the ports of the plurality of oil passages D, the plurality of second runners L2 may be respectively connected to the outer portions of the ports of the plurality of oil passages D, and the second arc-shaped section L21 of the second runner L2 is away from the rotating shaft 1 relative to the first arc-shaped section L11 of the first runner L1. Second arc-shaped sections L21 of at least two second runners L2 are connected to form an arc-shaped structure; or the second arc-shaped sections L21 of the plurality of second runners L2 may be connected to form a closed ring.

The second runner L2 may include two solutions: Solution 1: The second runner L2 includes the through opening. Solution 2: The second runner L2 includes the second arc-shaped section L21 and the second radial section L22. In addition, the second runner L2 may be connected to one oil passage D, or may be connected to two oil passages D.

For the solution 1, when the cooling oil first flows to the outer side of the oil passage and then spreads to the inner side of the oil passage, that is, "outer side first and inner side second", if a side of the oil passage close to the rotating shaft is closed, a side of the through opening close to the rotating shaft is closed; or if a side of the oil passage close to the rotating shaft is open, a side of the through opening close to the rotating shaft is open. When the cooling oil first flows to the inner side of the oil passage and then spreads to the outer side of the oil passage, that is, "inner side first and outer side second", regardless of whether a side of the oil passage close to the rotating shaft is open or closed, a side of the through opening close to the rotating shaft is closed.

For the solution 2, when the cooling oil first flows to the outer side of the oil passage and then spreads to the inner side of the oil passage, that is, "outer side first and inner side second", if a side of the oil passage close to the rotating shaft is closed, a side of the second arc-shaped section L21 close to the rotating shaft is closed; or if a side of the oil passage close to the rotating shaft is open, a side of the second arc-shaped section L21 close to the rotating shaft is open. When the cooling oil first flows to the inner side of the oil passage and then spreads to the outer side of the oil passage, that is, "inner side first and outer side second", regardless of whether a side of the oil passage close to the rotating shaft is open or closed, a side of the second arc-shaped section L21 close to the rotating shaft is closed. Further, second arc-shaped sections L21 of at least two second runners L2 may be connected to form an arc-shaped structure; or the second arc-shaped sections L21 of the plurality of second runners L2 may be connected to form a closed ring.

3. A correspondence between each of the first runner L1 and the second runner L2 and the oil passage D may include, but is not limited to, the following four solutions:

Solution 1: The first runner L1 and the second runner L2 are in a one-to-one correspondence with the oil passage D. That is, at the first end plate 21 and the second end plate 22, the plurality of first runners L1 and the plurality of oil passages D may be disposed in a one-to-one correspondence, and the plurality of second runners L2 and the plurality of oil passages D may be disposed in a one-to-one correspondence.

Solution 2: The second runner L2 is in a one-to-one correspondence with the oil passage D, and the first end plate 21 and the second end plate 22 are disposed in a staggered manner. As shown in FIG. 26, at the first end plate 21, the plurality of second runners L2 and the plurality of oil passages D may be disposed in a one-to-one correspondence, and the first runner L1 is disposed in a correspondence with one of two adjacent oil passages D; and at the second end plate 22, the plurality of second runners L2 and the plurality of oil passages D may be disposed in a one-to-one correspondence, and the first runner L1 is disposed in a correspondence with the other of the two adjacent second runners L2.

Solution 3: As shown in FIG. 12, at one end of the oil passage D, that is, at the first end plate 21, the first runner L1 is connected to two adjacent oil passages D along the circumferential direction, and the second runner L2 is located between two adjacent first runners L1 and is connected to other two adjacent oil passages D; and at the other end of the oil passage D, that is, at the second end plate 22, the first runner L1 is connected to the two adjacent oil passages D, and the second runner L2 is located between the two adjacent first runners L1 and is connected to the other two adjacent oil passages D.

Solution 4: As shown in FIG. 11, at one end of the oil passage D, that is, at the first end plate 21, the first runner L1 is connected to two adjacent oil passages D along the circumferential direction, and the second runner L2 is located between two adjacent first runners L1 and is connected to other two adjacent oil passages D; and at the other end of the oil passage D, that is, at the second end plate 22, the first runner L1 is connected to the other two adjacent oil passages, and the second runner L2 is located between the two adjacent first runners L1 and is connected to the two adjacent oil passages D.

4. Whether a side of the oil passage D close to the rotating shaft 1 is closed or open does not change the shape of the cross section of the oil passage D, that is, regardless of whether a side of the oil passage D is open or closed, the shape of the cross section of the oil passage D is the same. When a side of the oil passage D is open or closed, for a difference between structures of the first runner L1 and the second runner L2, refer to the foregoing related content about the runner structure. The shape of the cross section of the oil passage D may include, but is not limited to, the following solutions:

Solution 1: A cross section of the oil passage D is a rectangle.

Solution 2: A cross section of the oil passage D is I-shaped.

Solution 3: A cross section of the oil passage D on the third channel D3 is I-shaped, and a cross section of the oil passage D on a part other than the third channel D3 is in a shape of two parallel line segments.

In the rotor provided in the embodiments, the first runner and the second runner that are not connected are spaced on the end plate. The first runner has at least one inlet, and the inlet is connected to the oil hole of the rotating shaft. The second runner has at least one outlet, and the outlet is connected to the outside of the rotor. For example, the outlet may be an oil throwing hole. When the second runner is a through opening, an end of the through opening facing the outside is an outlet. The iron core body is provided with an axial oil passage, the cooling oil generates radial flow in the axial oil passage, and the first runner and the second runner of the end plate are respectively connected to one or more axial oil passages.

Because the first runner connected to the oil hole of the rotating shaft and the second runner connected to the outside of the rotor that are disposed on the end plate are spaced along the circumferential direction and the radial direction and are not connected, the cooling oil in the hollow channel of the rotating shaft enters the first runner through the oil hole on the rotating shaft, flows to the oil passage on the iron core body, and can be thrown out from the oil passage of the iron core body through the second runner. In this way, oil inlet and oil throwing do not interfere with each other. In addition, after entering the oil passage on the iron core body through the first runner, the cooling oil flows along the axial direction, so that the cooling oil in the oil passage accumulates layer by layer until the entire oil passage is filled. In this way, thicknesses of oil films in the oil passages can be basically consistent, so that oil amounts entering the second runner from the inner portions of the ports at two ends of the rotor iron core assembly are not greatly different, and the second runners on the end plates at two ends of the rotor iron core assembly are thrown out, thereby ensuring even oil throwing of the rotor, and avoiding a local hot spot. This helps improve performance of the motor or avoid excessive heating of the motor and implement low costs.

It should be noted that the foregoing embodiments are merely intended for describing, but not for limiting the embodiments. Although described in detail with reference to the foregoing embodiments, persons of ordinary skill in the art should understand that they may still make without departing from the scope of the solutions of the embodiments.

The invention claimed is:

1. A rotor, comprising:
a rotating shaft having a hollow channel, wherein a plurality of oil holes is spaced along a circumferential direction on an outer wall of at least one end of the rotating shaft, and each oil hole of the plurality of oil holes is connected to the hollow channel; and
a rotor iron core assembly, sleeved on the rotating shaft, comprising
a first end plate,
a second end plate, and
an iron core body located between the first end plate and the second end plate, wherein a plurality of first runners and a plurality of second runners are respectively disposed along the circumferential direction on inner sides of the first end plate and the second end plate that face the iron core body, the plurality of oil holes at one end of the rotating shaft is connected to the plurality of first runners on one of the first end plate and the second end plate in a one-to-one correspondence, the plurality of second runners is separately connected to the outside of the rotor iron core assembly, and each first runner and each second runner are spaced along the circumferential direction and a radial direction and are not connected; and
a plurality of oil passages is spaced on the iron core body along the circumferential direction, each oil passage comprises a plurality of channels arranged in sequence along the radial direction, and each oil passage of the plurality of oil passages runs through the iron core body along an axial direction; after either the plurality of first runners or the plurality of second runners is respectively connected to outer portions of ports of the plurality of oil passages away from the rotating shaft, the plurality of second runners or the plurality of first runners is respectively connected to inner portions of the ports of the plurality of oil passages close to the rotating shaft each first runner is connected to at least one oil passage, and each second runner is connected to at least one oil passage.

2. The rotor according to claim 1, wherein the plurality of first runners is respectively connected to the inner portions of the ports of the plurality of oil passages, the plurality of second runners is respectively connected to the outer portions of the ports of the plurality of oil passages, and a side of each oil passage close to the rotating shaft is open; and each first runner comprises a first arc-shaped section, wherein a side of the first arc-shaped section close to the rotating shaft is open and is connected to the oil hole, wherein
first arc-shaped sections of the plurality of first runners are connected to the plurality of oil passages in a one-to-one correspondence; or
a first arc-shaped section of each first runner is separately connected to two oil passages that are adjacent along the circumferential direction.

3. The rotor according to claim 1, wherein
at the first end plate and the second end plate, the plurality of first runners and the plurality of oil passages are disposed in a one-to-one correspondence, and the plurality of second runners and the plurality of oil passages are disposed in a one-to-one correspondence; or
at the first end plate, the plurality of second runners and the plurality of oil passages are disposed in a one-to-one correspondence, each first runner is disposed in a correspondence with one of two adjacent oil passages and, at the second end plate, the plurality of second runners and the plurality of oil passages are disposed in a one-to-one correspondence, and each first runner is disposed in a correspondence with the other of the two adjacent second runners; or
at the first end plate, each first runner is connected to two adjacent oil passages along the circumferential direction, and each second runner is located between two adjacent first runners and is connected to other two adjacent oil passages; and
at the second end plate, each first runner is connected to the two adjacent oil passages and each second runner is located between the two adjacent first runners and is connected to the other two adjacent oil passages; or
at the first end plate, each first runner is connected to two adjacent oil passages along the circumferential direction, and each second runner is located between two adjacent first runners and is connected to other two adjacent oil passages; and
at the second end plate, each first runner is connected to the other two adjacent oil passages and each second runner is located between the two adjacent first runners and is connected to the two adjacent oil passages.

4. The rotor according to claim 1, wherein
a cross section of each oil passage is a rectangle; or
each oil passage comprises a first channel, a third channel, and a second channel that are arranged in sequence close to the rotating shaft along the radial direction and that run through the iron core body along the axial direction, wherein a port of the first channel is the outer portion, a port of the second channel is the inner portion, and a width of the third channel along the circumferential direction is less than a width of each of the first channel and the second channel along the circumferential direction, so that a cross section of each oil passage is I-shaped; or
each oil passage comprises a first channel, a third channel, and a second channel that are arranged in sequence close to the rotating shaft along the radial direction, wherein the first channel runs through the iron core body along the axial direction, the second channel extends from one end of the iron core body to the middle or the other end of the iron core body along the axial direction, a port of the first channel is the outer portion, a port of the second channel is the inner portion, and the third channel is located in the middle of the iron core body along the axial direction and a width of the third channel along the circumferential direction is less than a width of each of the first channel and the second channel along the circumferential direction, so that a cross section of each oil passage on the third channel is I-shaped, and a cross section of each oil passage on a part other than the third channel is in a shape of two parallel line segments.

5. The rotor according to claim 1, wherein the iron core body comprises a plurality of silicon steel sheets arranged along the axial direction, wherein the first end plate is of an integrated structure, and the second end plate is of an integrated structure; or the first end plate and the second end plate each comprise at least a first silicon steel sheet and a second silicon steel sheet that are arranged along the axial direction, the second silicon steel sheet is located between the first silicon steel sheet and the iron core body, a through hole connected to the outside is disposed on the first silicon steel sheet, a first pattern and a second pattern are disposed on the second silicon steel sheet, a plate surface of the first silicon steel sheet and the first pattern form each first runner, and the plate surface of the first silicon steel sheet, the through hole, and the second pattern form each second runner, wherein when the plurality of first runners and/or the plurality of second runners form a closed ring, the first silicon steel sheet is fixedly connected to the second silicon steel sheet.

6. The rotor according to claim 5, further comprising:

a sleeve disposed around an outer circumferential wall of the rotor iron core assembly, wherein the sleeve covers a gap between the first end plate and the iron core body, a gap between a plurality of silicon steel sheets of the iron core body, and a gap between the iron core body and the second end plate.

7. The rotor according to claim 1, wherein the plurality of first runners is respectively connected to the outer portions of the ports of the plurality of oil passages, and the plurality of second runners is respectively connected to the inner portions of the ports of the plurality of oil passages; or the plurality of first runners is respectively connected to the inner portions of the ports of the plurality of oil passages, and the plurality of second runners is respectively connected to the outer portions of the ports of the plurality of oil passages, and a side of each oil passage close to the rotating shaft is closed and each first runner comprises:

a first arc-shaped section, extending along a circumferential direction of the rotor iron core assembly, wherein each first arc-shaped section is connected to each oil passage in a one-to-one correspondence, or two ends of each first arc-shaped section are respectively connected to two oil passages that are adjacent along the circumferential direction; and a first radial section, wherein one end of the first radial section is connected to the first arc-shaped section, and the other end of the first radial section extends to an inner circumferential wall of the rotor iron core assembly along the radial direction towards the rotating shaft and is connected to the oil hole.

8. The rotor according to claim 7, wherein first arc-shaped sections of at least two first runners are connected to form an arc-shaped structure; or the first arc-shaped sections of the plurality of first runners are connected to form a closed ring.

9. The rotor according to claim 7, wherein the second runner comprises a through opening disposed on the first end plate or the second end plate, one end of the through opening along the axial direction is connected to the outside, and the other end of the through opening along the axial direction is correspondingly connected to the oil passage, wherein a side of the oil passage close to the rotating shaft is closed; or a side of the oil passage close to the rotating shaft is open, the plurality of first runners is respectively connected to the inner portions of the ports of the plurality of oil passages, the plurality of second runners is respectively connected to the outer portions of the ports of the plurality of oil passages, and a side of the through opening close to the rotating shaft is closed; or a side of each oil passage close to the rotating shaft is open, the plurality of first runners is respectively connected to the outer portions of the ports of the plurality of oil passages, the plurality of second runners is respectively connected to the inner portions of the ports of the plurality of oil passages, a side of the through opening close to the rotating shaft is open, and the through opening extends to the inner circumferential wall of the rotor iron core assembly along the radial direction.

10. The rotor according to claim 7, wherein each second runner further comprises:

a second arc-shaped section, extending along a circumferential direction of the rotor iron core assembly, wherein each second arc-shaped section is connected to each oil passage in a one-to-one correspondence, or two ends of the second arc-shaped section are respectively connected to two oil passages that are adjacent along the circumferential direction; and a second radial section, connected to the second arc-shaped section and extending along the radial direction away from the rotating shaft, wherein an oil throwing hole connected to the outside is disposed on the second radial section, wherein the second arc-shaped section and the first arc-shaped section of the first runner are spaced along the radial direction.

11. The rotor according to claim 10, wherein the plurality of first runners is respectively connected to the outer portions of the ports of the plurality of oil passages, the plurality of second runners is respectively connected to the inner portions of the ports of the plurality of oil passages, the first arc-shaped section is away from the rotating shaft relative to the second arc-shaped section, and each second arc-shaped section is located between first radial sections of two adjacent first runners along the circumferential direction, wherein a side of each oil passage close to the rotating shaft is closed, and a side of the second arc-shaped section of each second runner close to the rotating shaft is closed; or a side of each oil passage close to the rotating shaft is open, a side of the second arc-shaped section of each second runner close to the rotating shaft is open, and the second arc-shaped section extends to the inner circumferential wall of the rotor iron core assembly along the radial direction.

12. The rotor according to claim 10, wherein the plurality of first runners is respectively connected to the inner portions of the ports of the plurality of oil passages, the plurality of second runners is respectively connected to the outer portions of the ports of the plurality of oil passages, and the second arc-shaped section of each second runner is away from the rotating shaft relative to the first arc-shaped section of each first runner, wherein second arc-shaped sections of at least two second runners are connected to form an arc-shaped structure; or the second arc-shaped sections of the plurality of second runners are connected to form a closed ring.

13. A motor, comprising a stator and a rotor, wherein the rotor comprises:

a rotating shaft, having a hollow channel, wherein a plurality of oil holes is spaced along a circumferential direction on an outer wall of at least one end of the rotating shaft, and each oil hole is connected to the hollow channel; and a rotor iron core assembly, sleeved on the rotating shaft, and comprising a first end plate, a second end plate, and an iron core body located between the first end plate and the second end plate, wherein a plurality of first runners and a plurality of second runners are respectively disposed along the circumferential direction on inner sides of the first end plate and the second end plate that face the iron core body, the plurality of oil holes at one end of the rotating shaft is connected to the plurality of first runners on one of the first end plate and the second end plate in a one-to-one correspondence, the plurality of second runners is separately connected to the outside of the rotor iron core assembly, and each first runner and each second runner are spaced along the circumferential direction and a radial direction and are not connected; and a plurality of oil passages is spaced on the iron core body along the circumferential direction, each oil passage comprises a plurality of channels arranged in sequence along the radial direction, and each oil passage runs through the iron core body along an axial direction; after either the plurality of first runners or the plurality of second runners is respectively connected to outer portions of ports of the plurality of oil passages away from the rotating shaft, the plurality of second runners or the plurality of first runners is respectively connected to inner portions of the ports of the plurality of oil passages close to the rotating shaft, each first runner is connected to at least one oil passage, and each second runner is connected to at least one oil passage; and the rotor is rotatably sleeved in the stator, and the stator comprises a stator iron core and a stator winding wound around the stator iron core.

14. The motor according to claim 13, wherein the plurality of first runners is respectively connected to the inner portions of the ports of the plurality of oil passages, the plurality of second runners is respectively connected to the outer portions of the ports of the plurality of oil passages, and a side of each oil passage close to the rotating shaft is open, and each first runner comprises a first arc-shaped section, a side of the first arc-shaped section close to the rotating shaft is open, and is connected to the oil hole, wherein first arc-shaped sections of the plurality of first runners are connected to the plurality of oil passages in a one-to-one correspondence; or a first arc-shaped section of each first runner is separately connected to two oil passages that are adjacent along the circumferential direction.

15. The motor according to claim 13, wherein the plurality of first runners is respectively connected to the outer portions of the ports of the plurality of oil passages, and the plurality of second runners is respectively connected to the inner portions of the ports of the plurality of oil passages; or the plurality of first runners is respectively connected to the inner portions of the ports of the plurality of oil passages, and the plurality of second runners is respectively connected to the outer portions of the ports of the plurality of oil passages, and a side of the oil passage close to the rotating shaft is closed and each first runner comprises:

a first arc-shaped section, extending along a circumferential direction of the rotor iron core assembly, wherein the first arc-shaped section is connected to each oil passage in a one-to-one correspondence, or two ends of the first arc-shaped section are respectively connected to two oil passages that are adjacent along the circumferential direction; and a first radial section, wherein one end of the first radial section is connected to the first arc-shaped section, and the other end of the first radial section extends to an inner circumferential wall of the rotor iron core assembly along the radial direction towards the rotating shaft, and is connected to the oil hole.

16. The motor according to claim 15, wherein first arc-shaped sections of at least two first runners are connected to form an arc-shaped structure; or the first arc-shaped sections of the plurality of first runners are connected to form a closed ring.

17. The motor according to claim 15, wherein each second runner comprises a through opening disposed on the first end plate or the second end plate, one end of the through opening along the axial direction is connected to the outside, and the other end of the through opening along the axial direction is correspondingly connected to each oil passage, wherein a side of each oil passage close to the rotating shaft is closed; or a side of each oil passage close to the rotating shaft is open, the plurality of first runners is respectively connected to the inner portions of the ports of the plurality of oil passages, the plurality of second runners is respectively connected to the outer portions of the ports of the plurality of oil passages, and a side of the through opening close to the rotating shaft is closed; or a side of each oil passage close to the rotating shaft is open, the plurality of first runners is respectively connected to the outer portions of the ports of the plurality of oil passages, the plurality of second runners is respectively connected to the inner portions of the ports of the plurality of oil passages, a side of the through opening close to the rotating shaft is open, and the through opening extends to the inner circumferential wall of the rotor iron core assembly along the radial direction.

18. An electric vehicle, comprising a transmission apparatus, a wheel, and a motor, wherein the motor comprises a stator and a rotor, wherein the rotor comprises:

a rotating shaft having a hollow channel, wherein a plurality of oil holes is spaced along a circumferential direction on an outer wall of at least one end of the rotating shaft, and each oil hole is connected to the hollow channel; and a rotor iron core assembly, sleeved on the rotating shaft, comprises a first end plate, a second end plate, and an iron core body located between the first end plate and the second end plate, wherein a plurality of first runners and a plurality of second runners are respectively disposed along the circumferential direction on inner sides of the first end plate and the second end plate that face the iron core body, the plurality of oil holes at one end of the rotating shaft is connected to the plurality of first runners on one of the first end plate and the second end plate in a one-to-one correspondence, the plurality of second runners is separately connected to the outside of the rotor iron core assembly, and each first runner and each second runner are spaced along the circumferential direction and a radial direction and are not connected; and a plurality of oil passages is spaced on the iron core body along the circumferential direction, each oil passage comprises a plurality of channels arranged in sequence along the radial direction, and each oil passage runs through the iron core body along an axial direction; after either the plurality of first runners or the plurality of second runners is respectively connected to outer portions of ports of the plurality of oil passages away from the rotating shaft, the plurality of second runners or the plurality of first runners is respectively connected to inner portions of the ports of the plurality of oil passages close to the rotating shaft, each first runner is connected to at least one oil passage, and each second runner is connected to at least one oil passage; and the rotor is rotatably sleeved in the stator, and the stator comprises a stator iron core and a stator winding wound around the stator iron core; and the transmission apparatus, and the wheel are sequentially connected through transmission, the transmission apparatus is configured to transfer driving force output by the motor to the wheel, and the wheel is configured to drive the electric vehicle to travel.

19. The electric vehicle according to claim 18, wherein the plurality of first runners is respectively connected to the outer portions of the ports of the plurality of oil passages, and the plurality of second runners is respectively connected to the inner portions of the ports of the plurality of oil passages; or the plurality of first runners is respectively connected to the inner portions of the ports of the plurality of oil passages, and the plurality of second runners is respectively connected to the outer portions of the ports of the plurality of oil passages, and a side of each oil passage close to the rotating shaft is closed; and each first runner comprises:

a first arc-shaped section, extending along a circumferential direction of the rotor iron core assembly, wherein the first arc-shaped section is connected to each oil passage in a one-to-one correspondence, or two ends of the first arc-shaped section are respectively connected to two oil passages that are adjacent along the circumferential direction; and a first radial section, wherein one end of the first radial section is connected to the first arc-shaped section, and the other end of the first radial section extends to an inner circumferential wall of the rotor iron core assembly along the radial direction towards the rotating shaft, and is connected to the oil hole.

20. The electric vehicle according to claim 18, wherein the plurality of first runners is respectively connected to the inner portions of the ports of the plurality of oil passages, the plurality of second runners is respectively connected to the outer portions of the ports of the plurality of oil passages, and a side of each oil passage close to the rotating shaft is open; and each first runner comprises a first arc-shaped section, wherein a side of the first arc-shaped section close to the rotating shaft is open, and is connected to the oil hole, wherein first arc-shaped sections of the plurality of first runners are connected to the plurality of oil passages in a one-to-one correspondence; or a first arc-shaped section of each first runner is separately connected to two oil passages that are adjacent along the circumferential direction.

* * * * *